(12) United States Patent
Vemulapati

(10) Patent No.: US 10,860,558 B2
(45) Date of Patent: Dec. 8, 2020

(54) TECHNIQUES FOR MANAGING INDEX STRUCTURES FOR DATABASE TABLES

(71) Applicant: Apple Inc., Cupertino, CA (US)

(72) Inventor: Murali Vemulapati, Fremont, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 16/147,128

(22) Filed: Sep. 28, 2018

(65) Prior Publication Data

US 2020/0104388 A1  Apr. 2, 2020

(51) Int. Cl.
*G06F 16/00* (2019.01)
*G06F 16/22* (2019.01)
*G06F 16/245* (2019.01)

(52) U.S. Cl.
CPC ...... *G06F 16/2237* (2019.01); *G06F 16/2272* (2019.01); *G06F 16/2282* (2019.01); *G06F 16/245* (2019.01)

(58) Field of Classification Search
CPC ............. G06F 16/2282; G06F 16/2272; G06F 16/245; G06F 16/2237
See application file for complete search history.

(56) References Cited

U.S. PATENT DOCUMENTS

| 6,144,957 | A | 11/2000 | Cohen et al. |
| 6,360,213 | B1 | 3/2002 | Wagstaff et al. |
| 2005/0216518 | A1 | 9/2005 | Hu et al. |
| 2007/0050381 | A1* | 3/2007 | Hu ............ G06F 16/2237 |
| 2008/0140605 | A1* | 6/2008 | Gelhar ............ G06F 16/258 |
| 2012/0179712 | A1* | 7/2012 | Bestgen ......... G06F 16/2237 707/769 |
| 2016/0157367 | A1 | 6/2016 | Andre et al. |
| 2017/0060949 | A1* | 3/2017 | Li ............ G06F 16/24553 |

* cited by examiner

*Primary Examiner* — Cheryl Lewis
(74) *Attorney, Agent, or Firm* — Dickinson Wright RLLP

(57) ABSTRACT

Representative embodiments enable the management of index structures for data tables within a database. The techniques can include (1) receiving a request to perform an operation (e.g., read, write, etc.) on a row identifier (ID) associated with an index structure, (2) identifying a plurality of segments that corresponds to the index structure, where each segment stores a respective bitmap, (3) identifying, based on the row ID, a logical block ID of a logical block that encompasses the row ID, (4) utilizing the logical block ID to identify, among the plurality of segments, a subset of segments encompassed by the logical block, and (5) parsing each segment of the subset of segments to identify a respective bitmap that encompasses the row ID, and (6) in response to identifying the respective bitmap: performing an operation on a bitmap value that corresponds to the row ID.

20 Claims, 22 Drawing Sheets

TECHNIQUES FOR MANAGING INDEX STRUCTURES FOR DATABASE TABLES

FIELD

The described embodiments set forth techniques for implementing index structures for database tables. In particular, the techniques involve enabling a given index structure to both actively and passively represent row identifiers (IDs) associated with rows of a table to which the index structure corresponds, thereby improving overall performance and storage efficiency.

BACKGROUND

A database engine can be configured to manage an index table that tracks row identifiers (IDs) of rows of a database table, where the rows share a value for a particular field (i.e., column) of the database table. For example, if the rows associated with the row IDs (1, 2, 3, 4, 8, and 9) share the value, then the index table would store <1, 2, 3, 4, 8, 9>. Notably, under typical operational scenarios, the row IDs of the database table tend to increase rapidly, which can substantially increase the amount of memory required to store the index table (e.g., <1, 2, 3, 4, 8, 9, . . . 32,304, . . . 3,203,203, . . . ). One attempt to mitigate this issue involves the implementation of a bitmap, where each index of the bitmap corresponds to a row ID of the database table. This approach can be useful under scenarios where the row IDs of the database table persist throughout time and are linear in numbering. However, database updates and deletions can significantly disrupt the overall contiguity of the row IDs, which results in large spans of zeroes within the bitmap. In this regard, considerable amounts of storage space can unnecessarily be consumed while representing row IDs that are no longer relevant, which is undesirable for obvious reasons.

SUMMARY

The embodiments set forth techniques that enable index tables to be modified and managed in a way that improves the overall performance and storage efficiency of a database. According to some embodiments, a modified index table—referred to herein as an index structure—can be comprised of a collection of segments, where each segment actively represents a particular range of row identifiers (IDs) of rows in a database table associated with the index structure. Conversely, row IDs that are not actively represented by the segments are instead passively represented by the gaps that exist between the segments. In this regard, storage space is consumed through the active representation of row IDs, and freed through the passive representation of row IDs, thereby enabling the index structure to represent all relevant row IDs while consuming substantially less storage space than conventional index table/bitmap-based approaches.

One embodiment sets forth a method for identifying whether a row identifier (ID) is associated with an index structure for a database table. According to some embodiments, the method can be implemented at a database engine executing on a computing device, and include the steps of (1) receiving a request to identify whether an association exists between a row ID and the index structure, (2) identifying a plurality of segments that corresponds to the index structure, where each segment of the plurality of segments stores a respective bitmap associated with the bitmap, (3) identifying, based on the row ID, a logical block ID of a logical block that encompasses the row ID, (4) utilizing the logical block ID to identify, among the plurality of segments, a subset of segments encompassed by the logical block, and (5) in response to determining that the subset of segments includes at least one segment: parsing each segment of the subset of segments to identify a respective bitmap, if any, that encompasses the row ID, and in response to identifying the respective bitmap: returning, from the respective bitmap, a bitmap value that corresponds to the row ID.

Another embodiment sets forth a method for associating a row identifier (ID) with an index structure for a database table. According to some embodiments, the method can be implemented at a database engine executing on a computing device, and include the steps of (1) receiving a request to associate a row ID with an index structure, (2) identifying a plurality of segments that corresponds to the index structure, where each segment of the plurality of segments stores a respective bitmap, (3) identifying, based on the row ID, a logical block ID of a logical block that encompasses the row ID, (4) utilizing the logical block ID to identify, among the plurality of segments, a subset of segments encompassed by the logical block, and (5) in response to determining that the subset of segments includes at least one segment: parsing each segment of the subset of segments to identify a respective bitmap, if any, that encompasses the row ID. If the respective bitmap is not identified, then the method further includes (6) generating a new segment that stores a respective bitmap, that each reflect the position of the new segment relative to the plurality of segments. In any case, the method further includes (7) updating, within the respective bitmap, a bitmap value that corresponds to the row ID to reflect the association, and (8) performing available optimizations, if any, to the plurality of segments. According to some embodiments, the optimizations can include merging segments of the plurality of segments to increase efficiency.

Yet another embodiment sets forth a method for disassociating a row identifier (ID) from an index structure for a database table. According to some embodiments, the method can be implemented at a database engine executing on a computing device, and include the steps of (1) receiving a request to disassociate a row ID from an index structure, (2) identifying a plurality of segments that corresponds to the index structure, where each segment of the plurality of segments stores a respective bitmap, (3) identifying, based on the row ID, a logical block ID of a logical block that encompasses the row ID, (4) utilizing the logical block ID to identify, among the plurality of segments, a subset of segments encompassed by the logical block, and (5) in response to determining that the subset of segments includes at least one segment: parsing each segment of the subset of segments to identify a respective bitmap, if any, that encompasses the row ID. If the respective bitmap is not identified, then the method further includes (6) generating an error, as no association exists between the row ID and the index structure. Otherwise, the method includes (7) updating, within the respective bitmap, a bitmap value that corresponds to the row ID to reflect the disassociation, and (8) performing available optimizations, if any, to the plurality of segments. According to some embodiments, the optimizations can include deleting the segment that stores the respective bitmap to increase efficiency.

Additional embodiments include a non-transitory computer readable storage medium configured to store instructions that, when executed by a processor included in a computing device, cause the computing device to carry out any of the above-described methods. Additional embodiments include a computing device that includes a processor configured to cause the computing device to carry out any of the above-described methods.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The described embodiments set forth techniques for implementing index structures for database tables. In particular, the techniques involve enabling a given index structure to both actively and passively represent row identifiers (IDs) associated with rows of a table to which the index structure corresponds, thereby improving overall performance and storage efficiency. A more detailed discussion of the foregoing techniques is set forth below and described in conjunction with FIGS. 1-6, which illustrate detailed diagrams of systems and methods that can be used to implement these techniques.

Figure 1:
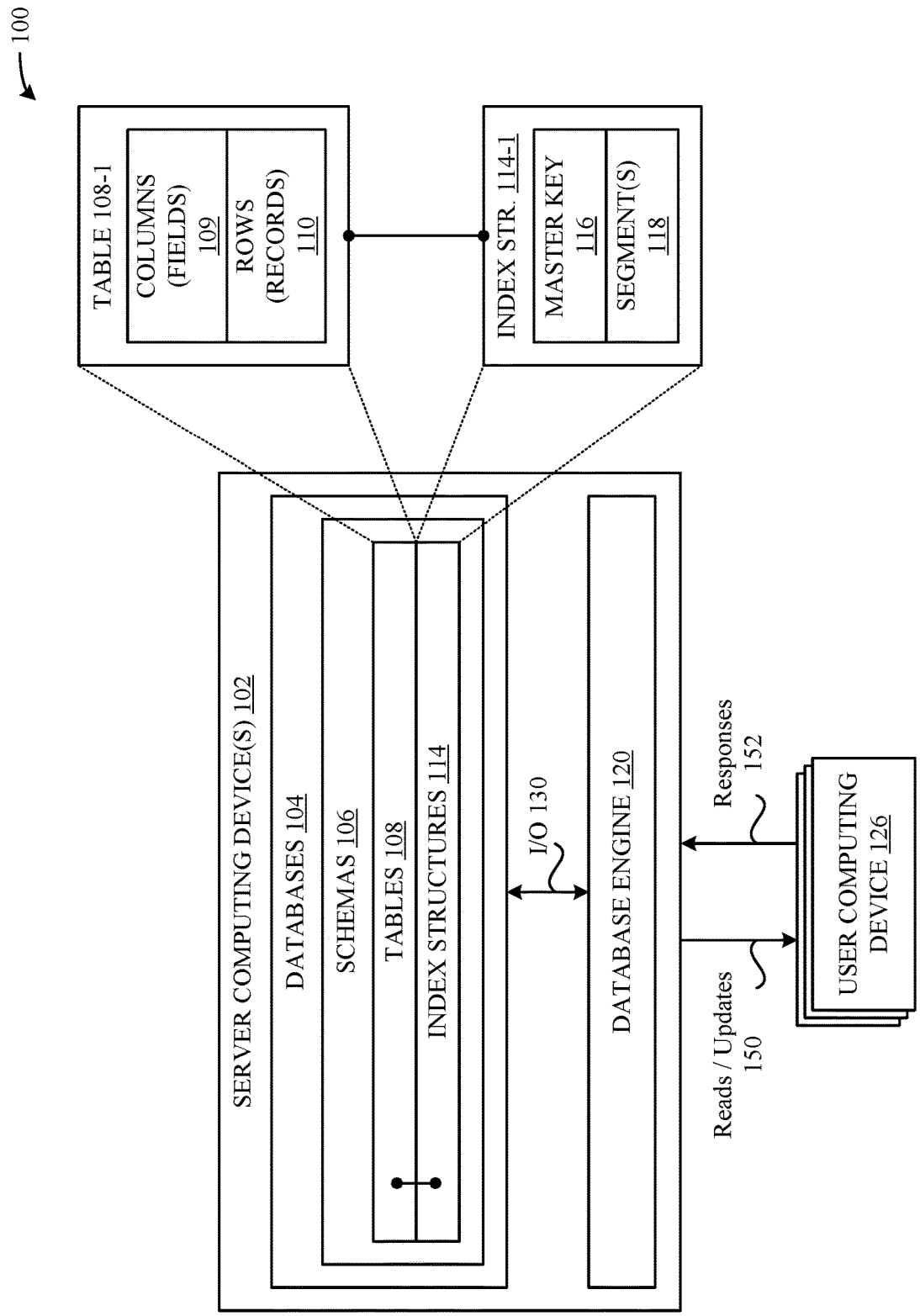
FIG. 1 illustrates a block diagram of different components of a system configured to implement the various techniques described herein, according to some embodiments.

FIG. 1 illustrates a block diagram of different components of a system 100 that can be configured to implement the various techniques described herein, according to some embodiments. More specifically, FIG. 1 illustrates a high-level overview of the system 100, which, as shown, can include server computing devices 102 and user computing devices 126. According to some embodiments, each server computing device 102 can represent any form of a computing device, e.g., a personal computing device, a desktop computing device, a rack-mounted computing device, and so on. Moreover, each user computing device 126 can represent a cellular phone or a smart phone, a tablet computer, a laptop computer, a notebook computer, a personal computer, a netbook computer, a media player device, an electronic book device, a MiFi® device, a wearable computing device, and so on. It is noted that the foregoing example computing devices are not meant to be limiting. On the contrary, the server computing devices 102 and the user computing devices 126 can represent any form of computing device without departing from the scope of this disclosure.

Although not illustrated in FIG. 1, the server computing devices 102 and the user computing devices 126 can include one or more processors, one or more memories, one or more storage devices, and so on. These components can work in conjunction to enable the server computing devices 102 and the user computing devices 126 to enable the implementation of useful features. In particular, the server computing device 102 can be configured to implement a database engine 120 that is designed to manage one or more databases 104. As shown in FIG. 1, each database 104 can include one or more schemas 106, and each schema 106 can include one or more tables 108. Additionally, each table 108 can include columns (i.e., fields) 109 that define various aspects of the table 108, e.g., Booleans, integers, decimals, strings, and so on. Each table 108 can further include rows (i.e., records) 110, where each row 110 can store values in accordance with the columns 109 of the table 108. It is noted that the discussion of advanced database configurations is being omitted in the interest of simplifying this disclosure. However, the database engine 120 can be configured to implement such advanced database configurations without departing from the scope of this disclosure.

According to some embodiments, and as illustrated in FIG. 1, the user computing devices 126 can be configured to issue read/update requests 150 to a given database engine 120 (executing on a server computing device 102), where, in turn, the database engine 120 carries out input/output (I/O) operations 130 in accordance with the request. For example, the database engine 120 can be configured to read data from databases 104, write data into databases 104, update data stored in databases 104, delete data stored in databases 104, and so on. In turn, the database engine 120 can provide responses 152 to the user computing devices 126, which can include, for example, data read from databases 104, confirmations of updates to data stored in databases 104, confirmations of deletions of data stored in databases 104, and so on. It is noted that the foregoing operations are not meant to represent an exhaustive list. On the contrary, the operations can encompass all known database operations without departing from the scope of this disclosure.

As further illustrated in FIG. 1, the database engine 120 can be configured to manage index structures 114 for tables 108. According to some embodiments, an index structure 114 (associated with a given table 108) can increase the efficiency by which the database engine 120 can identify rows 110 (of the table 108) that are each assigned the same value for a given column 109 (of the table 108). To facilitate this technique, the index structure 114 can include (1) a master key 116 that corresponds to the value of the given column 109 of the table 108, and (2) segments 118 that collectively identify row IDs of rows 110 in the table 108 that satisfy the requirements of the master key 116. According to some embodiments, the segments 118 can include information that enables the index structure 114 to actively or passively represent the rows 110 of the table 108. A more detailed description of the index structures 114, and the manner in which they are implemented, is described below in greater detail in FIG. 2.

Accordingly, FIG. 1 provides an overview of various entities that can operate in concert to implement the techniques set forth herein. A more detailed description of these entities, as well as the manner in which they communicate with one another, will now be provided below in conjunction with FIGS. 2, 3A-3E, 4A-4G, and 5A-5G.

Figure 2:
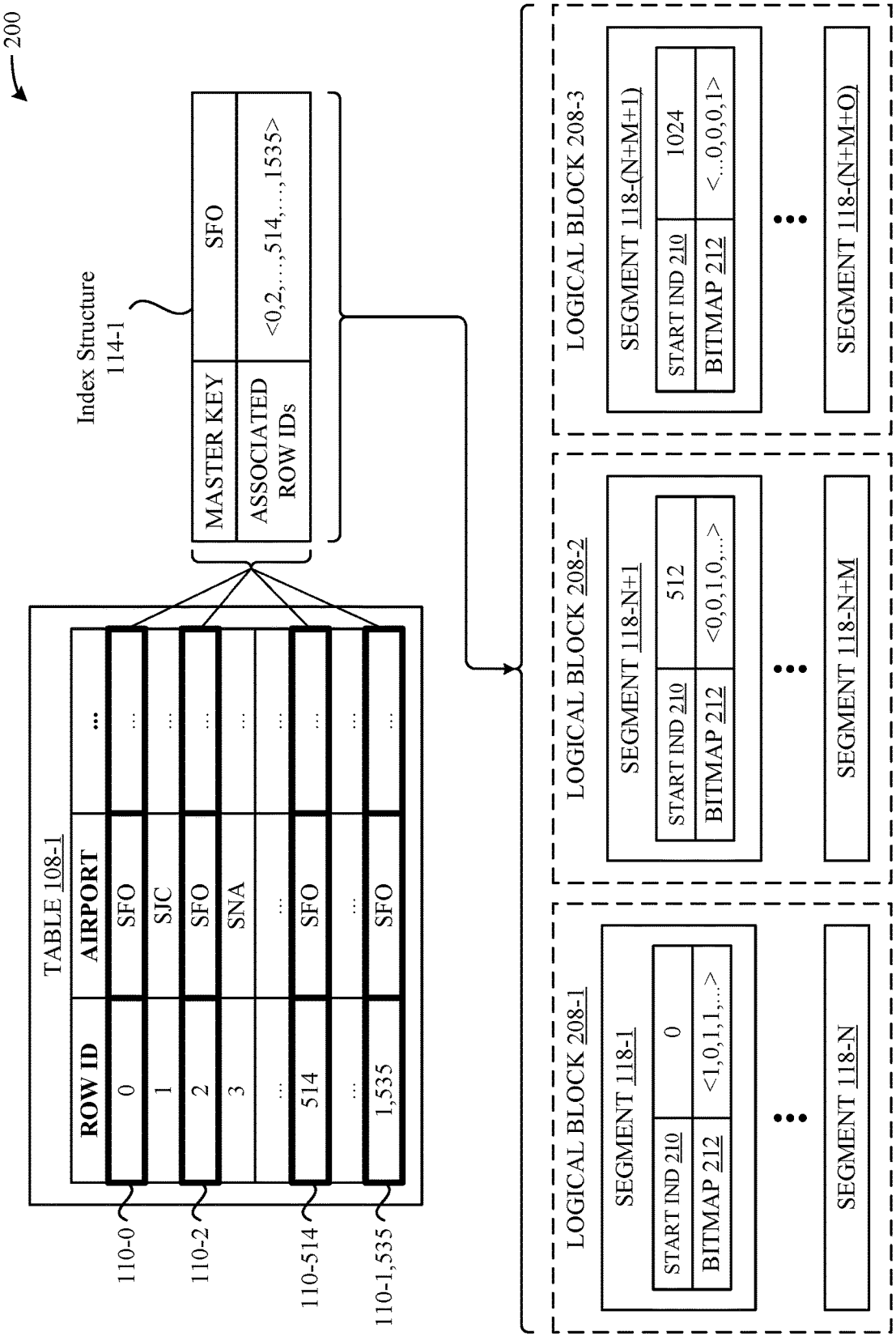
FIG. 2 illustrates a conceptual diagram in which example data is populated into a table and an index structure to identify how they are interrelated to one another, according to some embodiments.

To aid in the understanding of the embodiments set forth herein, FIG. 2 illustrates a conceptual diagram 200 in which example data is populated into an example table 108-1 and an example index structure 114-1, according to some embodiments. As shown in FIG. 2, the table 108-1 includes (at least) the columns 109 named "ROW ID" and "AIRPORT", where integer-based values are assigned to the "ROW ID" column 109, and string-based values are assigned to the "AIRPORT" column 109. In the example illustrated in FIG. 2, the table 108-1 includes a total of (1,536 rows) 110, where each row 110 is assigned an incremented value for the "ROW ID" column (e.g., 0, 1, 2, . . . 1,535). As also illustrated in FIG. 2, the rows 110 are assigned varying values for the "AIRPORT" column 109, e.g., "SFO", "SJC", and "SNA". It is noted that similar (or other values) can be assigned to the "AIRPORT" column 109 for the rows 110 not pictured in FIG. 2, e.g., rows 110-4 through rows 110-513 and rows 110-515 through rows 1,534, and that such values have been omitted in the interest of simplifying this disclosure.

As shown in FIG. 2, the master key 116 of the index structure 114-1 is assigned to the column 109 "AIRPORT" and value "SFO". In this regard, the index structure 114-1 is effectively bound not only to the table 108-1, but also to all rows 110 of the table 108-1 that have the value "SFO" assigned to their respective "AIRPORT" columns 109. For example, the rows 110-0, 110-2, 110, 110-514, and 110-1, 535 all correspond to the index structure 114-1, as their respective "AIRPORT" columns 109 are assigned the value "SFO". This notion is represented in FIG. 2 within the index structure 114-1 by the row ID entries, which indicate that the rows 110 assigned the respective row ID values 0, 2, 514, and 1535 are associated with the index structure 114-1. As previously noted herein, it is not practical to store the raw values—i.e., 0, 2, 514, 1,535, etc.—of the row IDs that correspond to the index structure 114-1, as these values can rapidly increase in size as rows 110 are added to the table 108-1. One approach for addressing this deficiency—at least in part—can involve representing each row ID as an index within a bitmap with a number of entries that span the range of the row IDs, such that each row ID can effectively be stored using a single bit (as opposed to, for example, a (32) bit integer). However, extensive database operations—e.g., insertions, updates, deletions, etc.—can cause large spans of row IDs to be disassociated from the index structure 114-1, thereby rendering the overall contiguity of the row IDs highly disparate (e.g., large spans of zeroes). As a result, large portions of the bitmap are unused, which is wasteful.

To cure the foregoing deficiencies, the index structure 114-1 can be configured to manage one or more segments 118 that enable the database engine 120 to look up and modify row IDs of rows 110 associated with the index structure 114-1 in a manner that is highly efficient with regard to both operational latency and storage space consumption. To implement this technique, each segment 118 can include a start index 210 and a bitmap 212. According to some embodiments, the start index 210 can represent an offset at which the bitmap 212 is disposed relative to the complete bitmap that is represented by the index structure 114-1. This notion is illustrated in FIG. 2 by the segments 118-1, 118-2, and 118-3, which each include bitmaps 212 that are (512) bits in length. In this regard, the segment 118-1—having a start index 210 of (0)—can represent the row IDs (0) through (511), the segment 118-2—having a start index 210 of (512)—can represent the row IDs (512) through (1023), and the segment 118-3—having a start index 210 of (1024)—can represent the row IDs (1024) through (1,535). As a brief aside, it is noted that the bitmap 212 of each segment 118 can be sized in accordance with a minimum required length, e.g., (32) bits, but can be expanded to a size that represents a multiple of the minimum required length (e.g., (512) bits) when conditions are met. A more detailed description of such conditions is provided below in greater detail in conjunction with FIGS. 3A-3E, 4A-4G, and 5A-5G.

Additionally, as shown in FIG. 2, the segments 118 can be logically disposed within logical blocks 208 to identify groups of segments 118 associated with a row ID of interest to be identified with less overhead. According to some embodiments, each logical block 208 can be sized as a multiple of the minimum size of each segment 118. For example, a logical block 208 can be sized at (4,096) bits to accommodate (4,096) row IDs when the minimum size for each segment 118 is (32) bits. In this regard, a given logical block 208—e.g., the logical block 208-1—can logically encompass up to (128) segments 118, assuming that each segment 118 represents a minimum of (32) row IDs (by way of the bitmap 212). Additionally, the segments 118 can be managed such that they are restricted from spanning across the boundaries of the logical block 208. In this manner, a given row ID of interest—e.g., row ID (637)—can be used to identify the logical block 208 in which one or more segments 118 that correspond to the row ID (637) are included. In turn, the database engine 120 can analyze the one or more segments 118 in succession to effectively identify whether the row ID 637 is represented by the one or more segments 118, thereby obviating the need for the database engine 120 to process any other segments 118 that are logically disposed within other logical blocks 208 (e.g., preceding or successive logical blocks 208).

Although not illustrated in FIGS. 1-2, it is noted that each index structure 114 can be associated with properties that indicate respective sizes for the logical blocks 208 and segments 118 associated with the index structure 114. For example, index structures 114 that are expected to represent highly-contiguous row IDs can be associated with larger-sized logical blocks 208 and segments 118, whereas index structures 114 that are expected to represent highly-disparate row IDs can be associated with smaller-sized logical blocks 208 and segments 118. In some embodiments, the database engine 120 can be configured to monitor the overall contiguity of various index structures 114 to identify appropriate sizes for the logical blocks 208/segments 118 with a goal of maximizing operational efficiency. In turn, the database engine 120 can be configured to carry out the appropriate updates to implement the updated sizes for the logical blocks 208 and segments 118, e.g., using the various techniques management and organization techniques that are described below in greater detail in conjunction with FIGS. 4A-4F and 5A-5F.

Accordingly, FIGS. 1-2—and the accompanying foregoing descriptions—identify the relationships that exist between the index structures 114 and the tables 108 described herein. To provide further context to these relationships, FIGS. 3A-3E, 4A-4G, and 5A-5G set forth detailed example scenarios in which the database engine 120 can utilize and manage the index structures 114 in accordance with database requests to improve overall operational efficiencies.

Figure 3A:
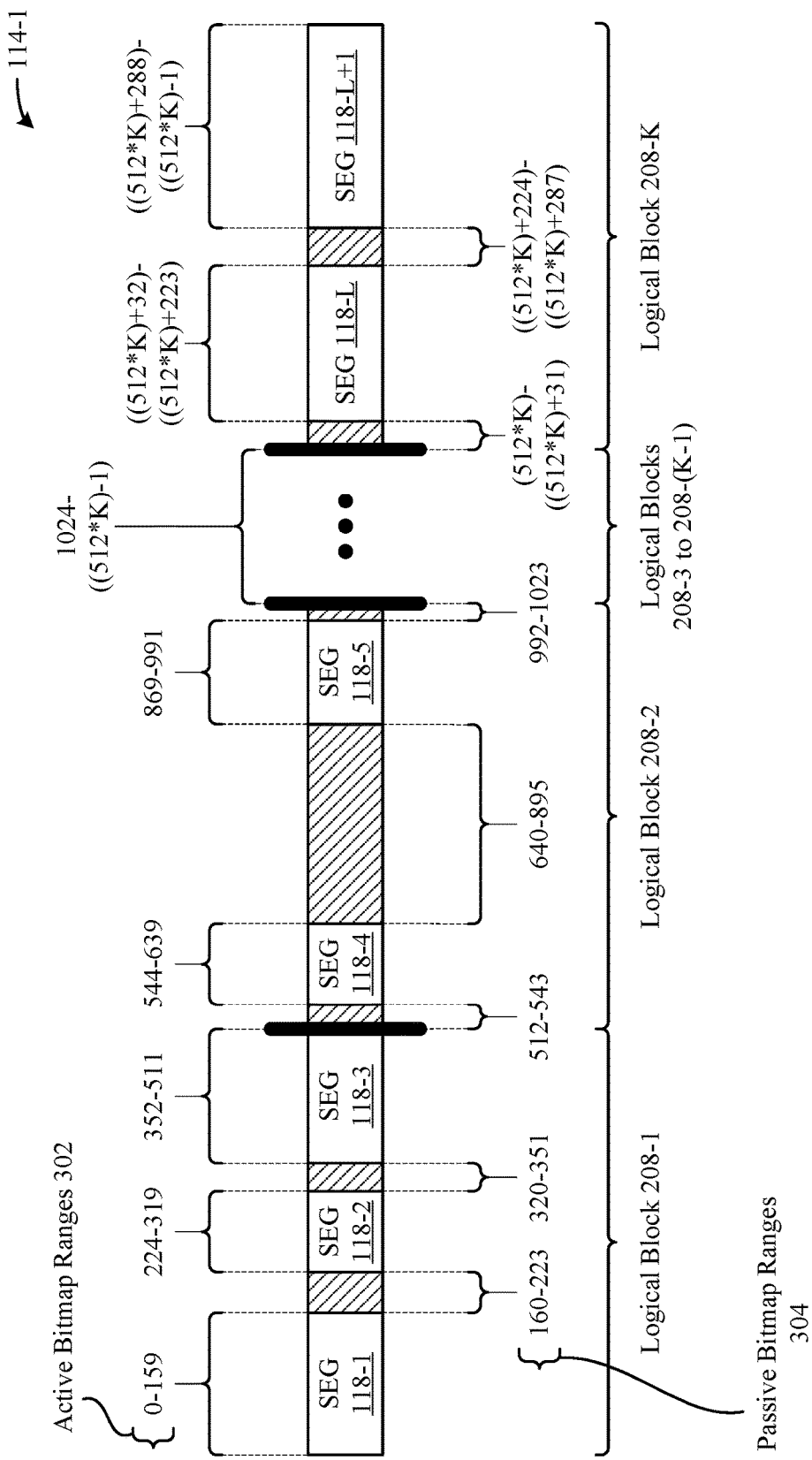
FIGS. 3A-3E illustrate conceptual and method diagrams that demonstrate the manner in which index structures can be implemented to increase the efficiency by which associations between row identifiers (IDs) and the index structures can be identified, according to some embodiments.
Figure 3B:
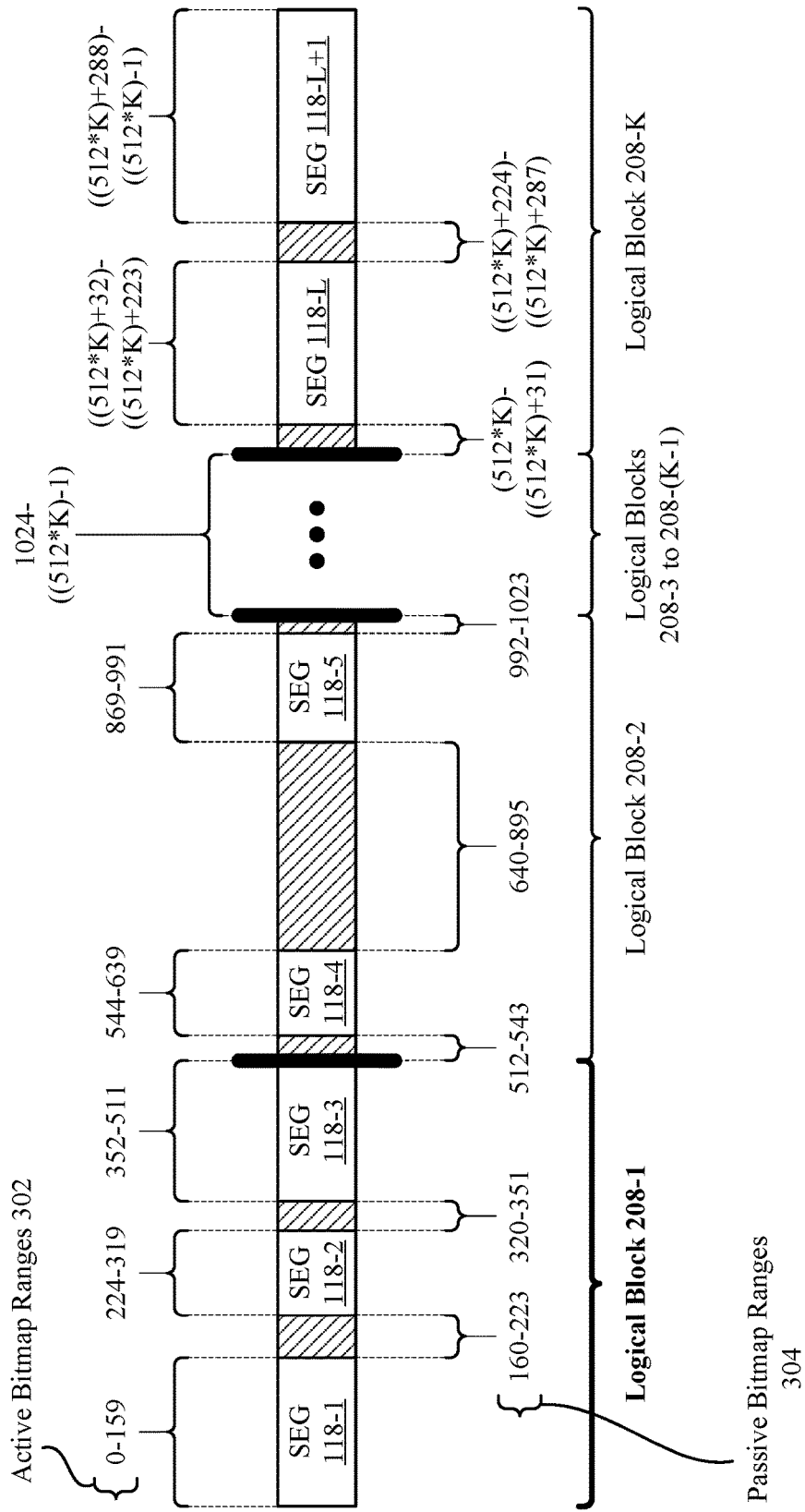

FIGS. 3A-3E illustrate conceptual and method diagrams that demonstrate the manner in which index structures 114 can be implemented to increase the efficiency by which associations between row IDs and the index structures 114 can be identified. In particular, FIG. 3A illustrates an example initial state of an index structure 114-1, where the index structure 114-1 is comprised of a collection of segments 118, and where different groups of the segments 118 are logically encompassed by different logical blocks 208. As indicated by the active bitmap ranges 302, each of the segments 118 represents a different portion of the row IDs that are actively represented by the index structure 114-1. As a brief aside, the term active representation constitutes forcibly storing a portion of bitmap data that identifies whether row IDs represented by the bitmap data are associated with the index structure 114-1. Moreover, the passive bitmap ranges 304 represent different portions of the row IDs that are passively represented by the index structure 114-1. As a brief aside, the term passive representation constitutes foregoing the storage of a portion of bitmap data that identifies whether row IDs represented by the bitmap data are associated with the index structure 114-1, as the absence of this bitmap data can be interpreted as the representation that the row IDs are not associated with the index structure 114-1.

As shown in FIG. 3A, a first step of an example lookup procedure can involve the database engine 120 receiving a request to identify whether an association exists between the row ID (358) and the index structure 114-1. In the examples illustrated in FIGS. 3A-3D, the index structure 114-1 can be associated with a master key 116 "SFO", such that the first step involves determining whether the row 110 (associated with row ID (358)) of a given table 108 (with which the index structure 114-1 is associated) includes a value ("SFO") in a column 109 that corresponds to the master key 116. Next, at FIG. 3B, and in response to the request, the database engine 120 can divide the row ID (358) by the size of the logical blocks 208 to identify the logical block 208 that corresponds to the row ID (358). In particular, an identifier for the logical block 208 can be determined by (i) dividing the row ID (358) by the size of the logical blocks 208 ((512) bits) to establish a quotient (i.e., result), and (ii) assigning the result to an integer value to effectively drop any decimal values of the result. In one example, when the row ID is (358) and the size of each logical block is (512) bits, the identifier for the logical block 208 would be (0.699)—which, represented as an integer, would take on the value (0). In another example, when the row ID is (752) and the size of each logical block is (512) bits, the identifier for the logical block 208 would be (1.468)—which, represented as an integer, would take on the value (1). In the examples illustrated in FIGS. 3A-3D, the size of each logical block 208 is (512) bits. Again, it is noted that this size is exemplary, and that any size can be implemented without departing from the scope of this disclosure. In any case, the database engine 120 identifies that the first logical block 208-1 corresponds to the row ID (358), where the first logical block 208 encompasses three different segments 118—the segment 118-1, the segment 118-2, and the segment 118-3. Notably, this identification obviates the need for the database engine 120 to analyze any other segments 118 associated with the index structure 114-1, as the database engine 120 will be able to identify, through analysis of the segments 118-1, 118-2, and 118-3, whether the row ID (358) is associated with the index structure 114-1.

Figure 3C:
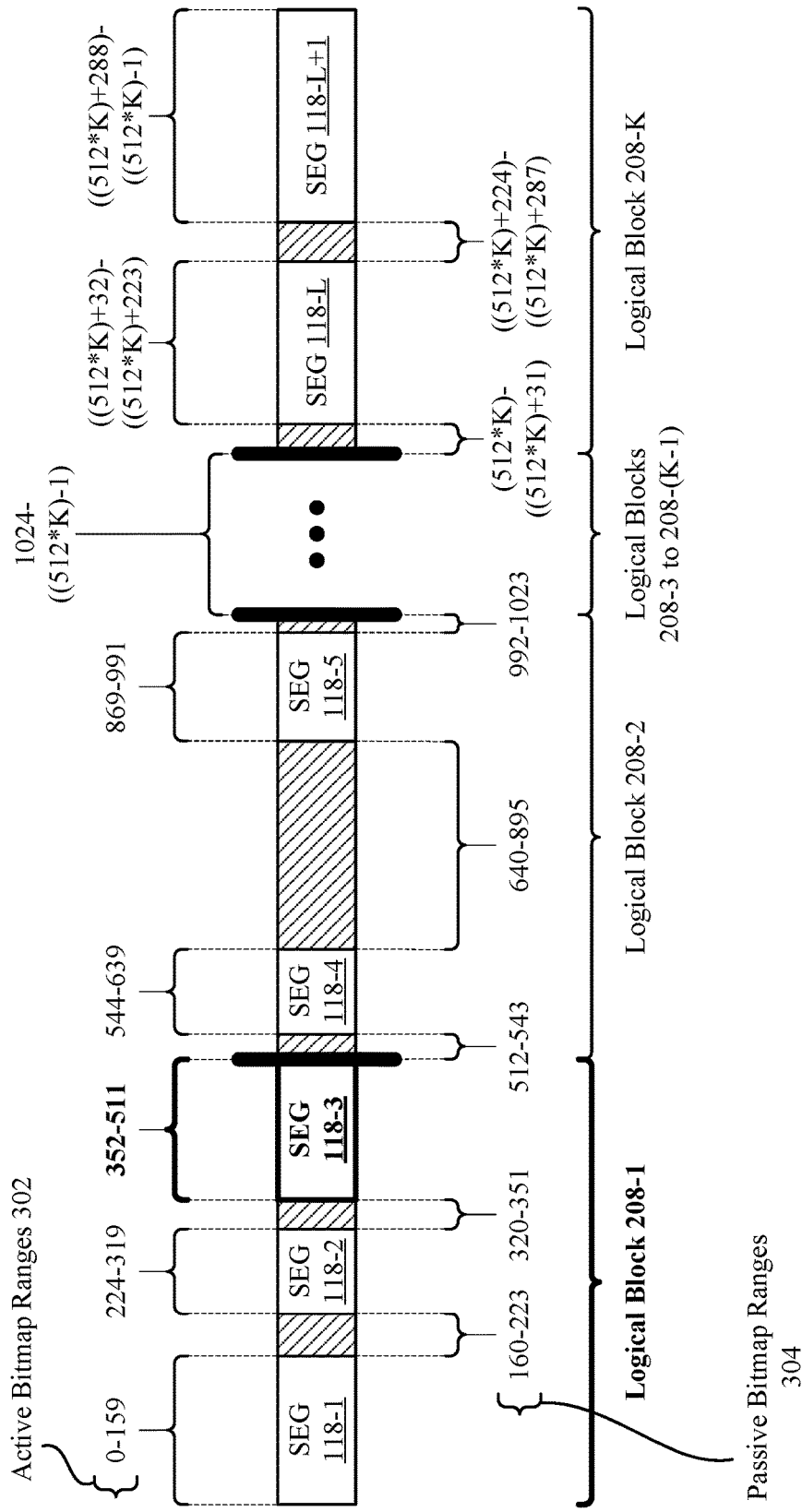

Accordingly, a third step illustrated in FIG. 3C involves the database engine 120 beginning with segment 118-1, and analyzing its (1) start index 210, and (2) bitmap 212, to determine whether the segment 118-1 actively represents the row ID (358). In the example illustrated in FIG. 3C, the segment 118-1 actively represents the row IDs (0-159). In this regard, the start index 210 for the segment 118-1 is (0), and the size of its bitmap 212 is (160) bits. Accordingly, the database engine 120 can identify that the row ID (358) is not actively represented by the segment 118-1, and can move on to the next segment 118, which is the segment 118-2. In the example illustrated in FIG. 3C, the segment 118-2 actively represents the row IDs (224-319). In this regard, the start index 210 for the segment 118-2 is (224), and the size of its bitmap 212 is (96) bits. Notably, and as illustrated by the passive bitmap ranges 304, the row IDs (160-223) are passively represented, as the row ID (224) represented by the start index 210 of the segment 118-2 does not immediately succeed the row ID (159) represented by the end of the bitmap 212 of the segment 118-1. Accordingly, because the segment 118-2 actively represents the row IDs (224-319), the database engine 120 is able to identify that the row ID (358) is not actively represented by the segment 118-2, and can move on to the next segment 118, which is the segment 118-3. In the example illustrated in FIG. 3C, the segment 118-3 actively represents the row IDs (352-511). In this regard, the start index 210 for the segment 118-3 is (352), and the size of its bitmap 212 is (160) bits. Accordingly, the database engine 120 can identify that the row ID (358) is actively represented by the segment 118-3, as the row ID (358) falls within the row ID range (i.e., (352-511) that is actively represented by the segment 118-3.

Figure 3D:
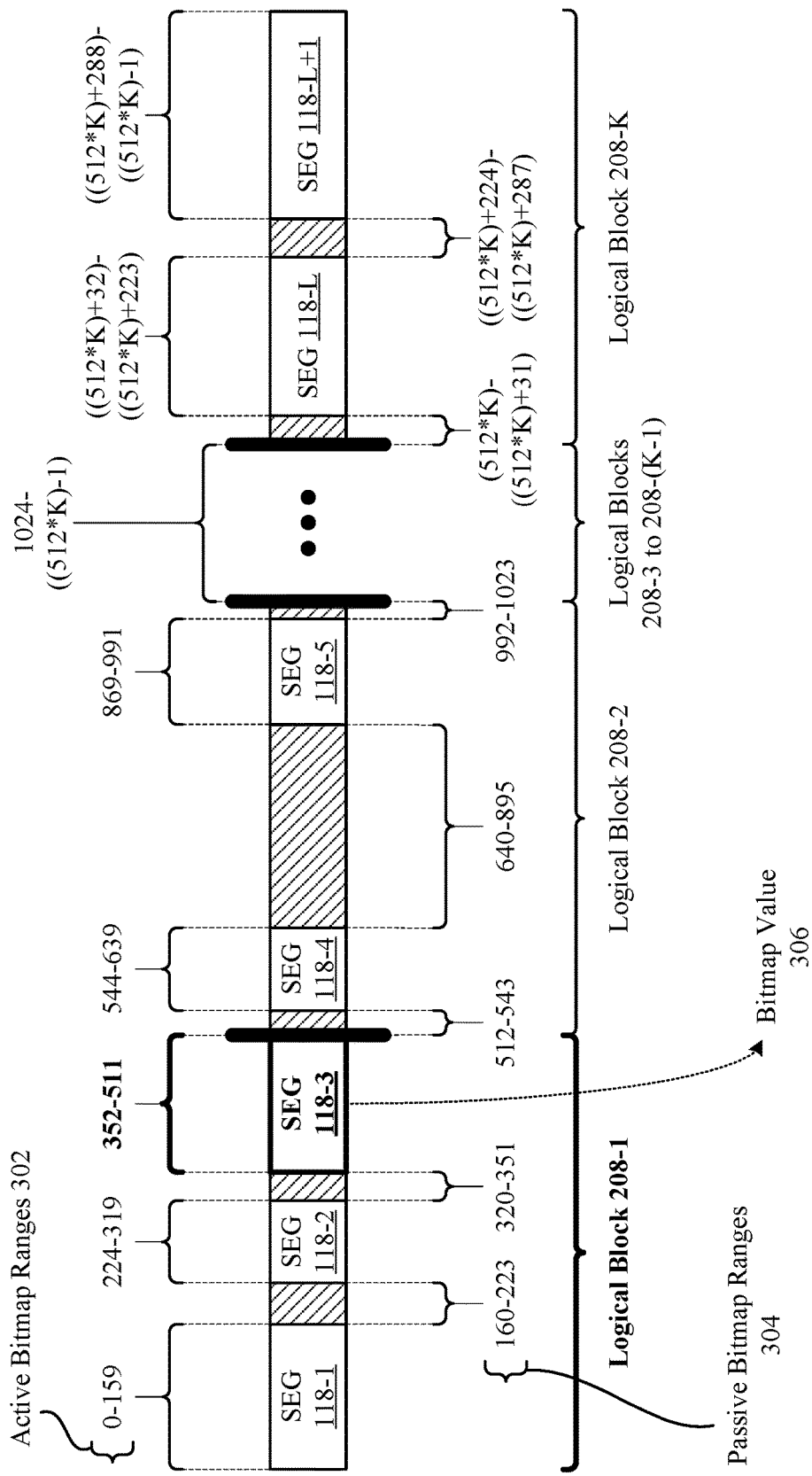

Accordingly, at a fourth step in FIG. 3D, the database engine 120 can parse the bitmap 212 of the segment 118-3 to identify whether the row ID (358) is associated with the index structure 114. In particular, the database engine 120 can subtract the start index 210 of the segment 118-3 to identify an offset value, and reference the value stored in the bitmap 212 at an index that coincides with the offset value. For example, the database engine 120 can perform a lookup of the index ((358) minus (352)=(6)) of the bitmap 212, and identify the value stored therein (illustrated in FIG. 3D as the bitmap value 306). As previously described herein, a value of "1" stored in the bitmap 212 can indicate that the row ID (358) is associated with the index structure 114, and a value of "0" stored in the bitmap 212 can indicate that the row ID (358) is not associated with the index structure.

Figure 3E:
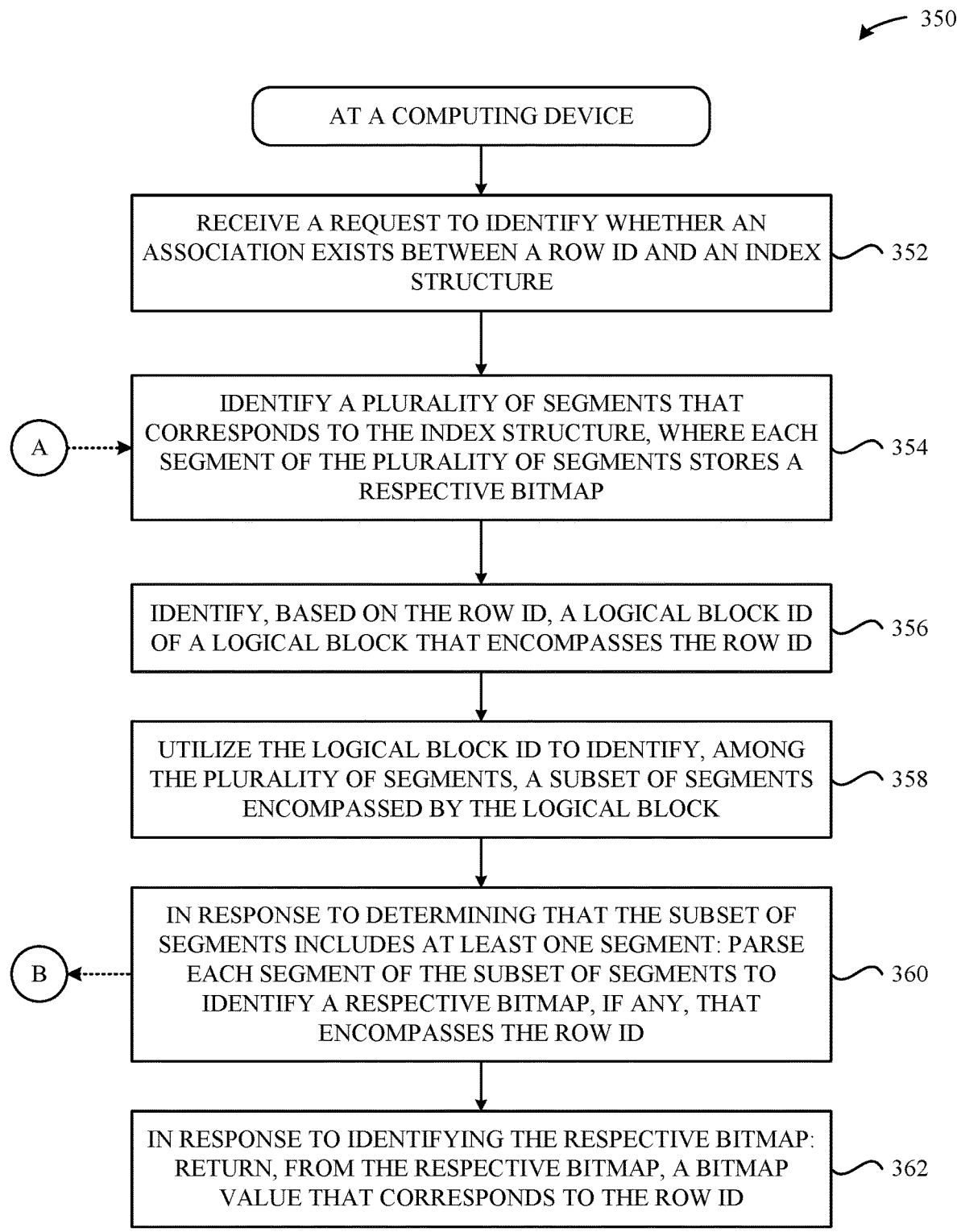

Accordingly, FIGS. 3A-3D illustrate an example breakdown of the manner in which the database engine 120 can efficiently identify whether an association exists between a row ID and an index structure 114. Additional high-level details will now be provided below in conjunction with FIG. 3E, which illustrates a method 350 that can be implemented to carry out the technique described above in conjunction with FIGS. 3A-3D. As shown in FIG. 3E, the method 350 begins at step 352, where the database engine 120 receives a request to identify whether an association exists between a row ID and an index structure (e.g., as described above in conjunction with FIG. 3A). At step 354, the database engine 120 identifies a plurality of segments that corresponds to the index structure, where each segment of the plurality of segments stores a respective bitmap (e.g., as described above in conjunction with FIG. 3A). At step 356, the database engine 120 identifies, based on the row ID, a logical block ID of a logical block that encompasses the row ID (e.g., as described above in conjunction with FIG. 3B). At step 358, the database engine 120 utilizes the logical block ID to identify, among the plurality of segments, a subset of segments encompassed by the logical block (e.g., as described above in conjunction with FIG. 3C). At step 360, the database engine 120, in response to determining that the subset of segments includes at least one segment: parses each segment of the subset of segments to identify a respective bitmap, if any, that encompasses the row ID (e.g., as described above in conjunction with FIG. 3C). Finally, at step 362, the database engine 120, in response to identifying the respective bitmap: returns, from the respective bitmap, a bitmap value that corresponds to the row ID (e.g., as described above in conjunction with FIG. 3D).

Accordingly, FIGS. 3A-3D illustrate the manner in which index structures 114 can be implemented to increase the efficiency by which associations between row IDs and the index structures 114 can be identified, according to some embodiments. As previously described herein, in order to maintain such efficiencies, the database engine 120 can be configured to actively manage the segments 118 in accordance with updates and deletions that are made to rows 110 associated with index structures 114. In particular, the database engine 120 can be configured to split, merge, and delete segments 118 of a given index structure 114 (where possible) to minimize the amount of storage space consumed by the index structure 114 while enabling the index structure 114 to fully represent, both actively and passively, the row IDs that can potentially be associated with the index structure 114.

Figure 4A:
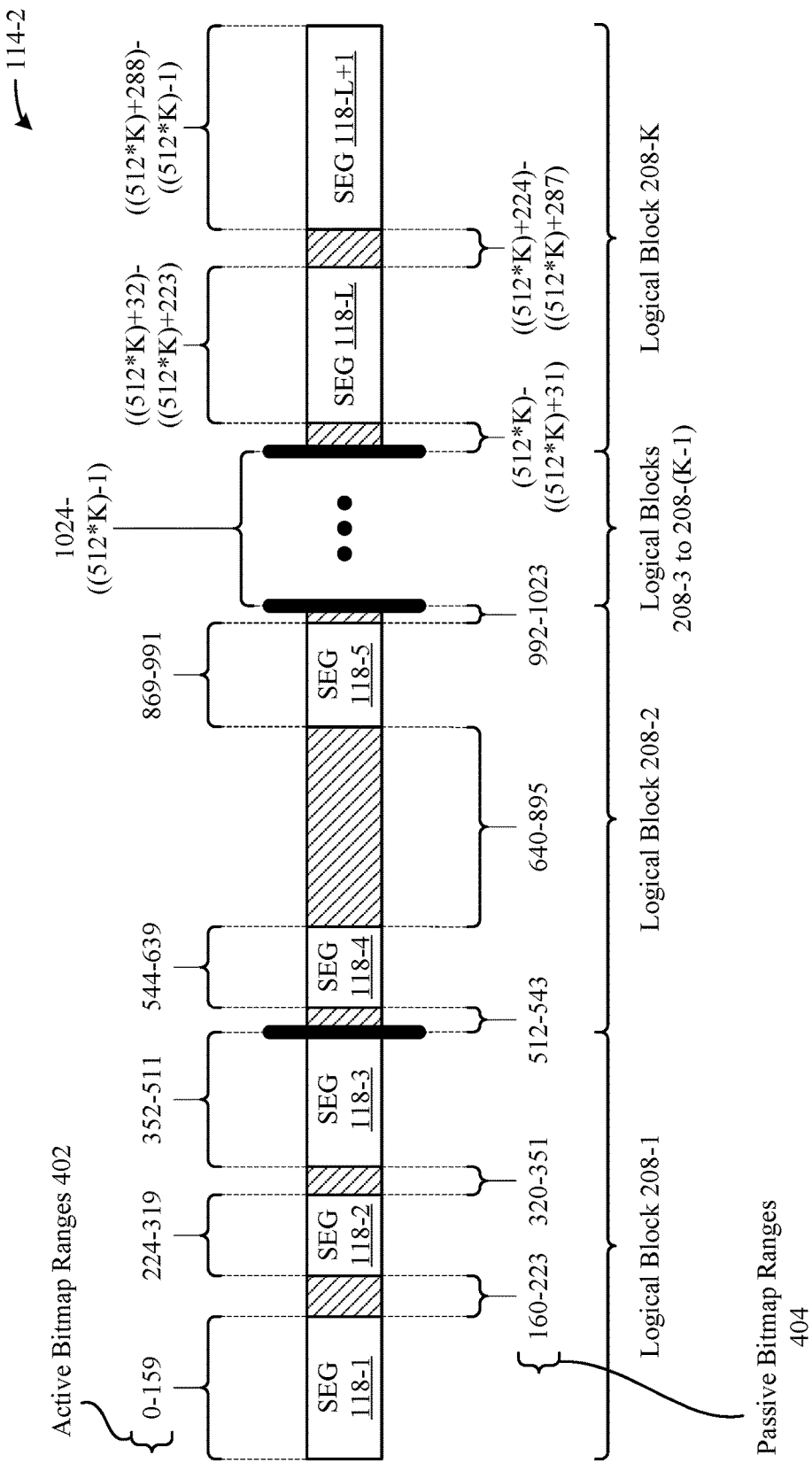
FIGS. 4A-4G illustrate conceptual and method diagrams that demonstrate the manner in which index structures can be implemented to enable insertions of new rows to be reflected within the index structures, according to some embodiments.

FIGS. 4A-4F illustrate conceptual and method diagrams that demonstrate the manner in which index structures 114 can be implemented to enable insertions of new rows 110 to be reflected within the index structures 114, according to some embodiments. In particular, FIG. 4A illustrates an example initial state of an index structure 114-2, where the index structure 114-2 is comprised of a collection of segments 118, and where different groups of the segments 118 are logically encompassed by different logical blocks 208. As indicated by the active bitmap ranges 402, each of the segments 118 represents a different portion of the row IDs that are actively represented by the index structure 114-2. Moreover, the passive bitmap ranges 404 represent different portions of the row IDs that are passively represented by the index structure 114-2. As shown in FIG. 4A, a first step of an example insertion procedure can involve the database engine 120 receiving a request to associate a row ID (320) with the index structure 114-2. In the examples illustrated in FIGS. 4A-4F, the index structure 114-2 can be associated with a master key 116 "SFO", such that the first step involves inserting a new row 110 (having a value "SFO" at a column 109 that corresponds to the master key 116) into the table 108 associated with the index structure 114-2.

Figure 4B:
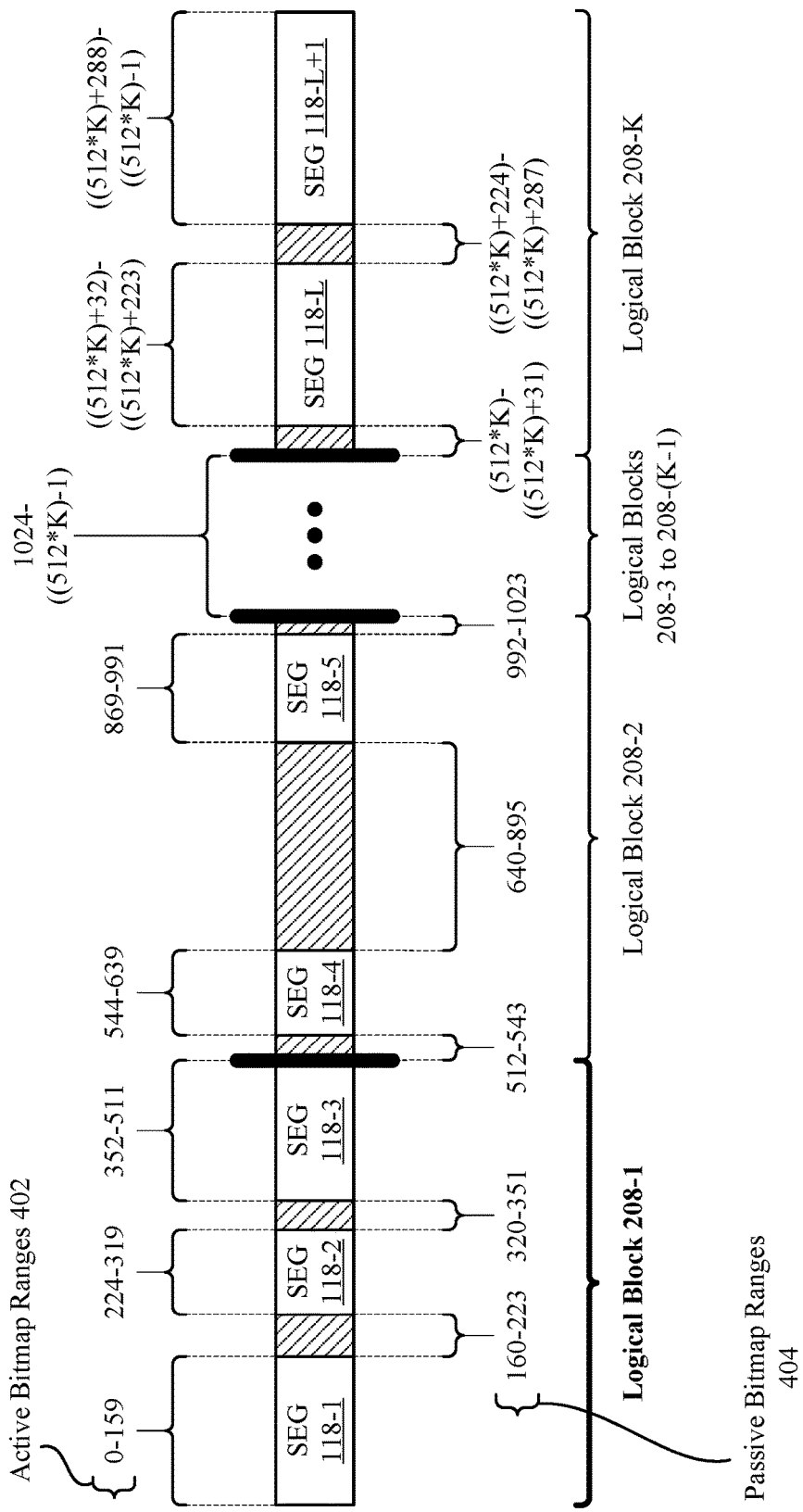

Next, at FIG. 4B, and in response to the request, the database engine 120 can divide the row ID (320) by the size of the logical blocks 208 to identify the logical block 208 that corresponds to the row ID (320). In the examples illustrated in FIGS. 4A-4F, the size of each logical block 208 is (512) bits. In this regard, the database engine 120 identifies that the first logical block 208-1 corresponds to the row ID (320), where the first logical block 208 encompasses three different segments 118—the segment 118-1, the segment 118-2, and the segment 118-3. Again, this identification obviates the need for the database engine 120 to analyze any other segments 118 associated with the index structure 114-2, as the database engine 120 will be able to identify, through analysis of the segments 118-1, 118-2, and 118-3, whether the row ID (320) is actively represented or passively represented. In particular, and as described in greater detail herein, when the row ID (320) is actively represented by one of the segments 118-1, 118-2, and 118-3, the database engine 120 can be configured to identify the appropriate bitmap 212, and update the value (e.g., set to "1") within the bitmap 212 that corresponds to the row ID (320). Conversely, when the row ID (320) is passively represented within the logical block 208-1, the database engine 120 can be configured to create a new segment 118 to actively represent the row ID (320), and update the value (e.g., set to "1") within the bitmap 212 of the new segment 118 that corresponds to the row ID (320).

Figure 4C:
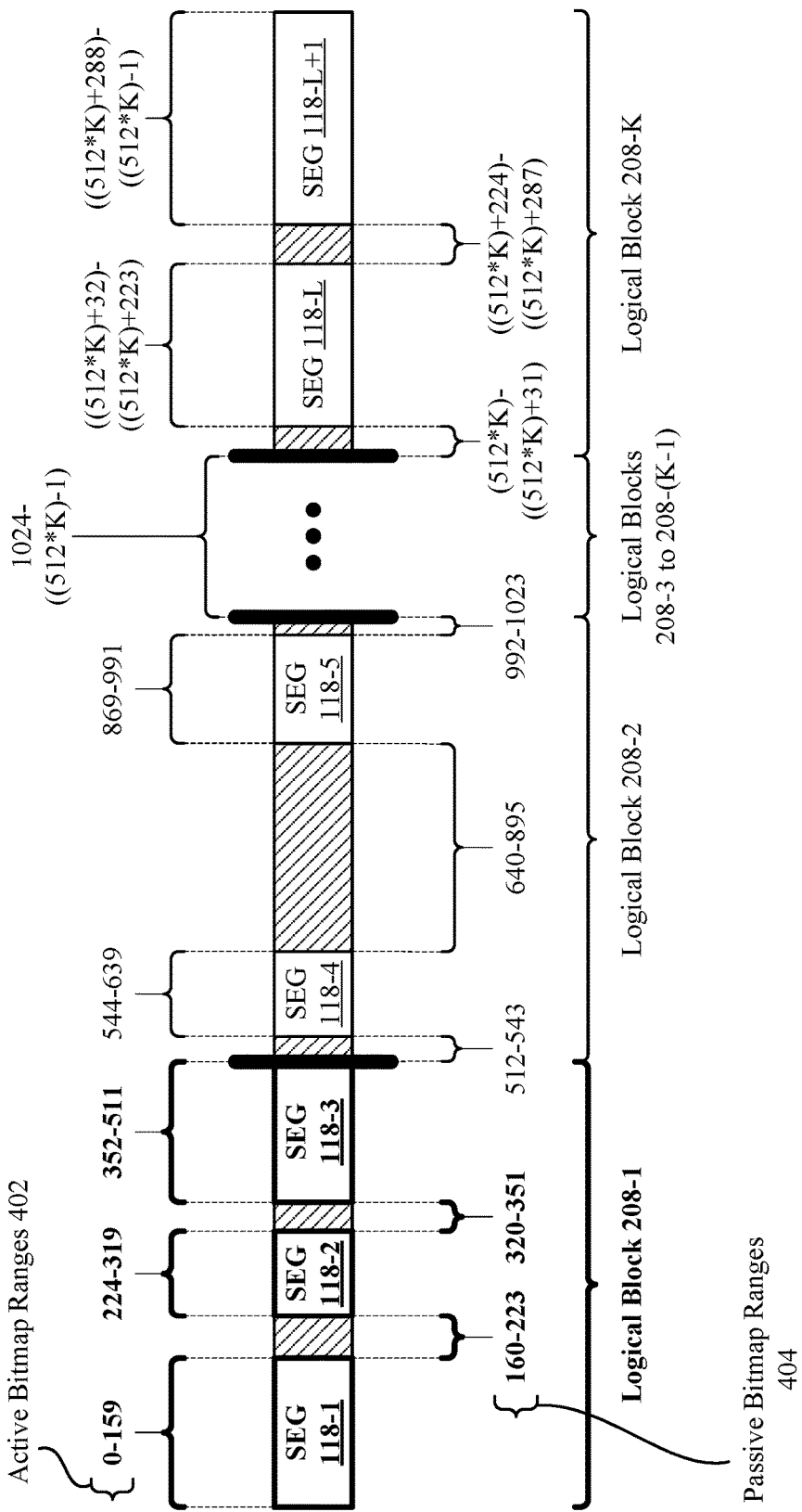
Figure 4D:
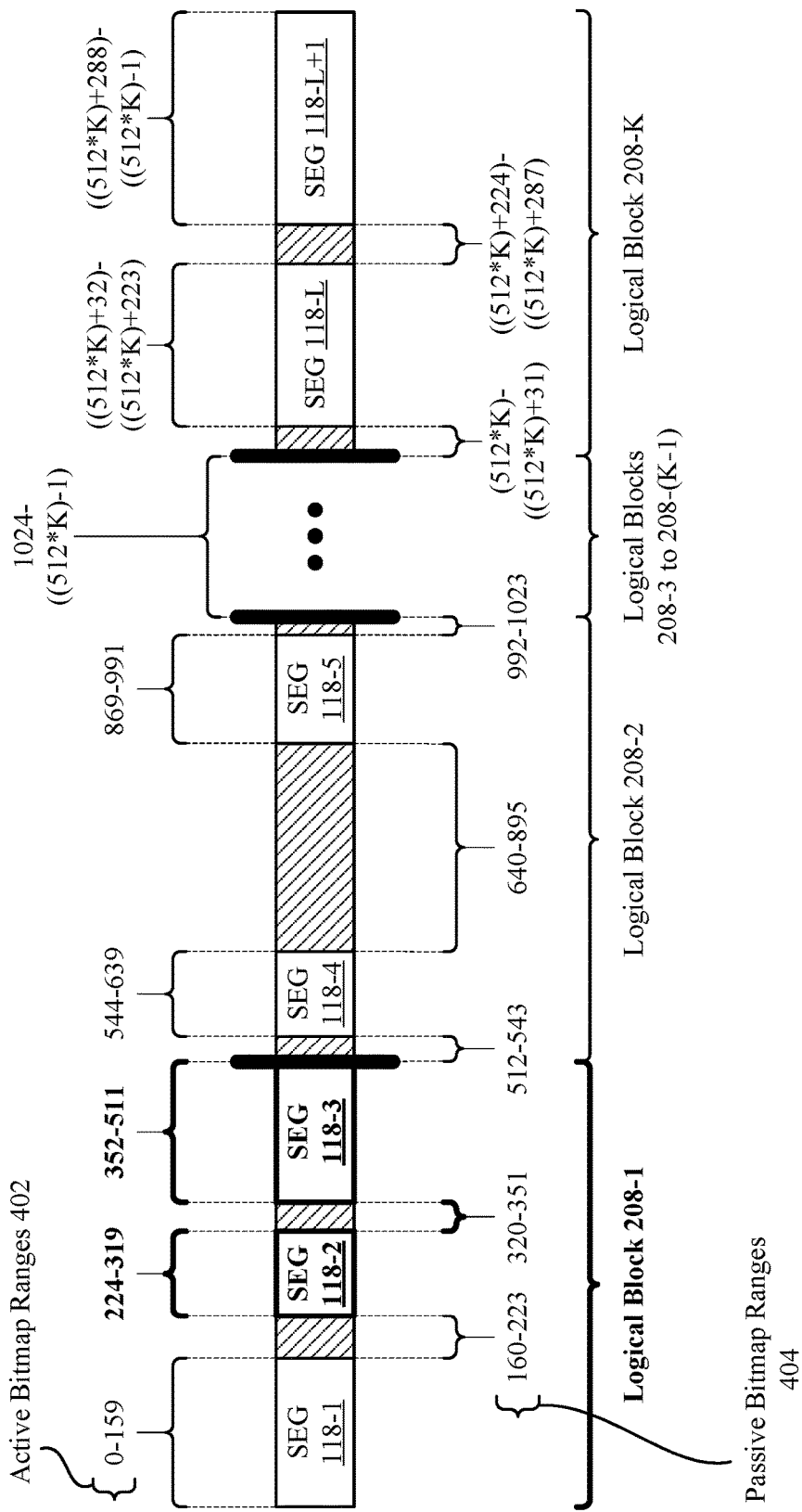
Figure 4E:
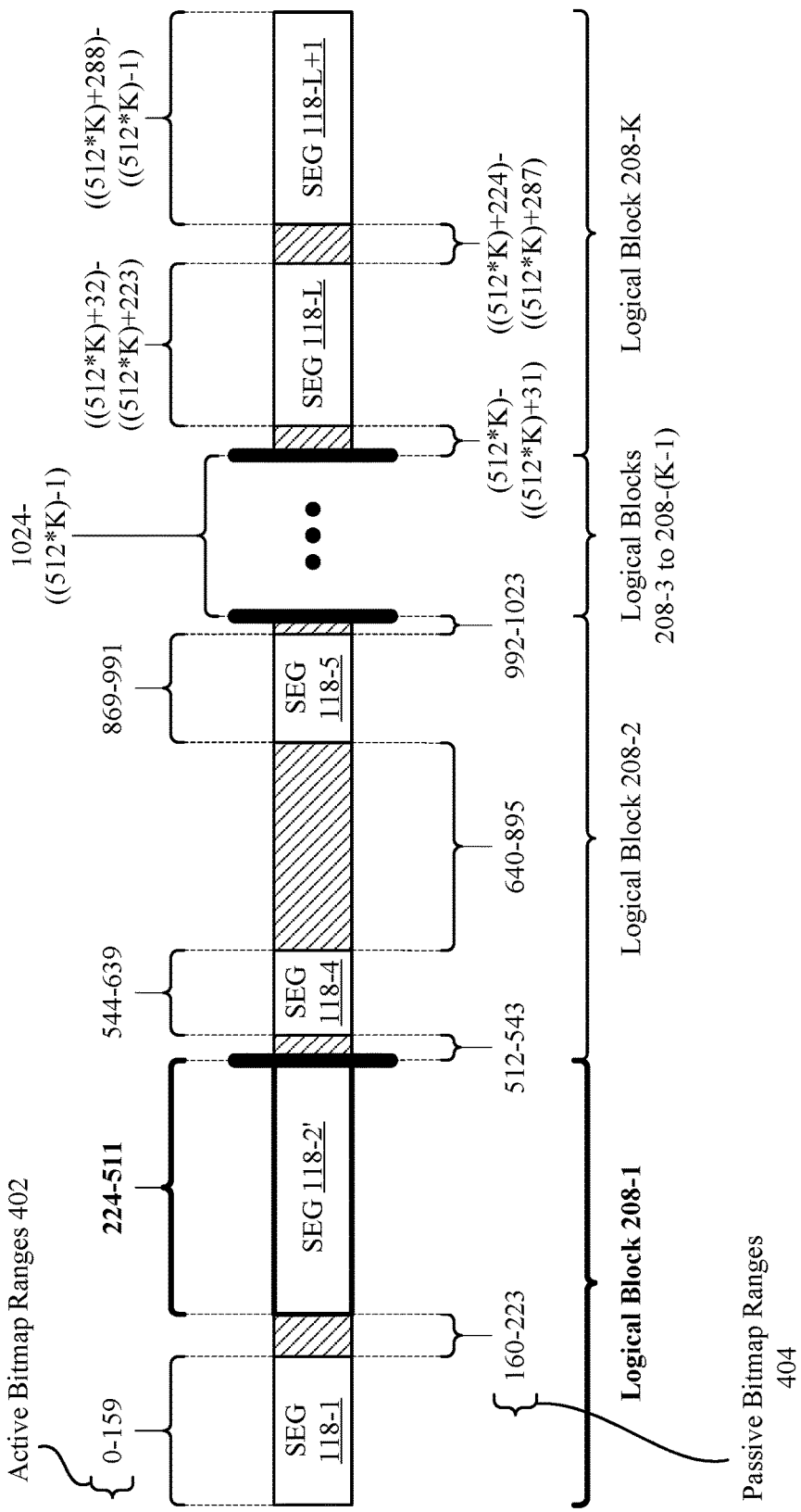

Accordingly, a third step illustrated in FIG. 4C involves the database engine 120 beginning with segment 118-1, and analyzing its (1) start index 210, and (2) bitmap 212, to determine whether the segment 118-1 actively represents the row ID (320). In the example illustrated in FIG. 4C, the segment 118-1 actively represents the row IDs (0-159). In this regard, the start index 210 for the segment 118-1 is (0), and the size of its bitmap 212 is (160) bits. Accordingly, the database engine 120 can identify that the row ID (320) is not actively represented by the segment 118-1, and can move on to the next segment 118, which is the segment 118-2. In the example illustrated in FIG. 4C, the segment 118-2 actively represents the row IDs (224-319). In this regard, the start index 210 for the segment 118-2 is (224), and the size of its bitmap 212 is (96) bits. Notably, and as illustrated by the passive bitmap ranges 404, the row IDs (160-223) are passively represented, as the row ID (224) represented by the start index 210 of the segment 118-2 does not immediately succeed the row ID (159) represented by the end of the bitmap 212 of the segment 118-1. Accordingly, because the segment 118-2 actively represents the row IDs (224-319), the database engine 120 is able to identify that the row ID (358) is not actively represented by the segment 118-2, and can move on to the next segment 118, which is the segment 118-3. In the example illustrated in FIG. 4C, the segment 118-3 actively represents the row IDs (352-511). In this regard, the database engine 120 identifies that the row ID (320) is not actively represented by any of the segments 118-1, 118-2, and 118-3, due to the fact that the row IDs (320-351) are passively represented between the segments 118-2 and 118-3. Consequently, it can be necessary to establish a segment 118 to actively represent the row ID (320). This action is illustrated at a fourth step in FIG. 4D.

In one approach, the database engine 120 can generate a new segment 118 that actively represents the row ID (320), e.g., a segment 118-4 that is logically disposed between the segment 118-2 and the segment 118-3. In this case, the start index 210 of the segment 118-4 would be assigned the value (320), and the bitmap 212 of the segment 118-4 would be sized at (32) bits. However, the establishment of the segment 118-4, while valid, would be inefficient, as the segments 118-2, 118-3, and 118-4 collectively represent a contiguous bitmap range that spans the row IDs (224-511). Accordingly, the database engine 120 can implement an optimized approach that involves merging the segment 118-2 and the segment 118-3 to form a single segment 118. This notion is illustrated at a fifth step in FIG. 4E, where the database engine 120 merges the segment 118-2 and the segment 118-3 to establish a segment 118-2' that spans the row IDs (224-511), thereby encompassing the row ID (320).

As a brief aside, it is noted that the database engine 120 can carry out the segment 118 merge events in any order without departing from the scope of this disclosure. For example, the database engine 120 can copy the bitmap 212 of the segment 118-3 (into the bitmap 212 of the segment 118-2), update the start index 210 and the bitmap 212 of the segment 118-2 to actively represent the row IDs (224-511), and delete the segment 118-3. In another example, the database engine 120 can copy the bitmap of the segment 118-2 (into the bitmap 212 of the segment 118-3), update the start index 210 and bitmap 212 of the segment 118-3 to actively represent the row IDs (224-511), and delete the segment 118-2. It is noted that other optimizations can be implemented without departing from the scope of this disclosure. For example, in-place updates of the start indexes 210 and/or bitmaps 212 to obviate the need to execute the above-described copy operations.

Figure 4F:
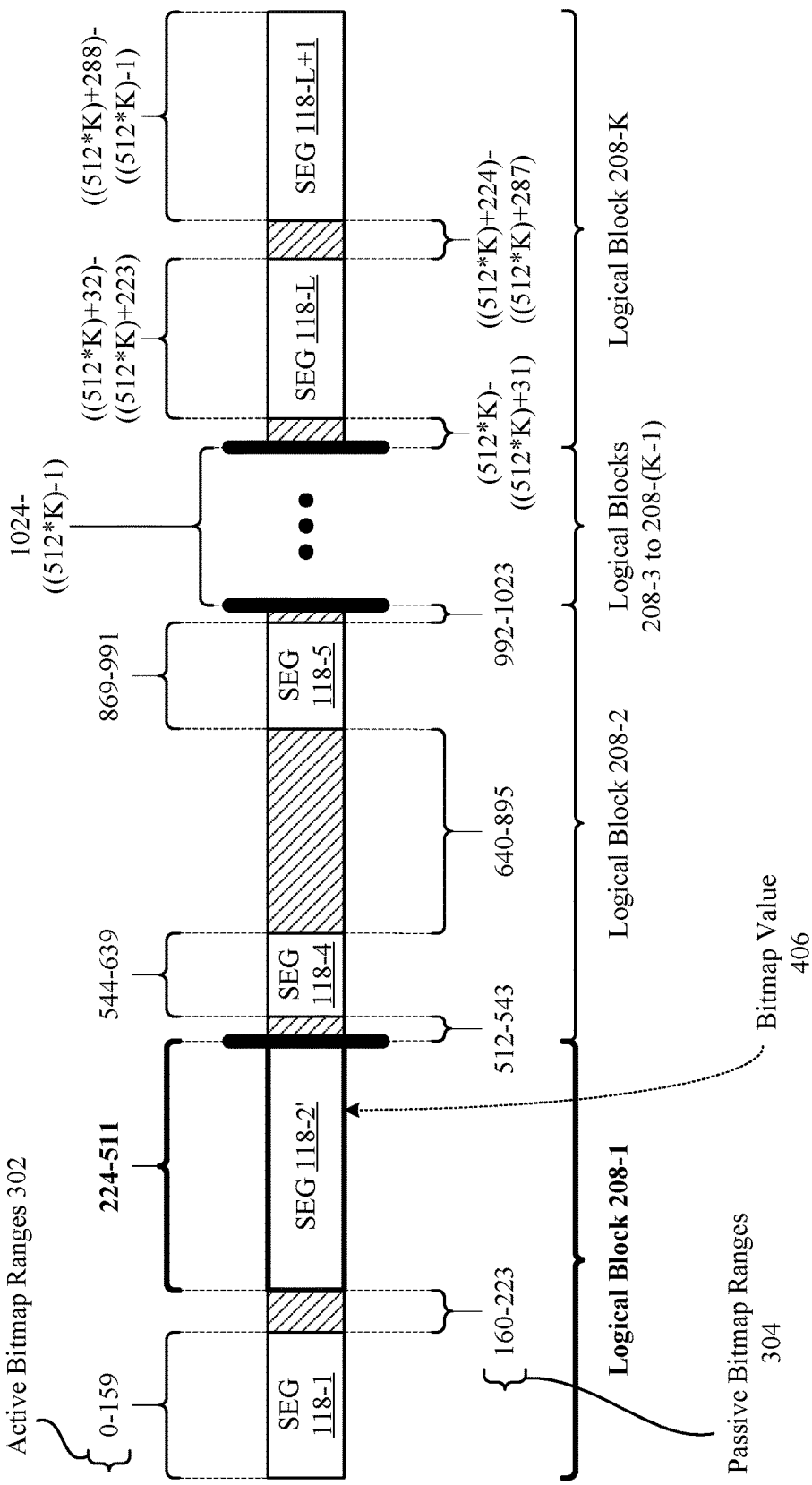

In any case, at a sixth step in FIG. 4F, the database engine 120 can parse the bitmap 212 of the segment 118-2' to identify the value within the bitmap 212 that corresponds to the row ID (320). For example, the database engine 120 can subtract the start index 210 of the segment 118-2' (i.e., (224)) to identify an offset value, and reference the value stored in the bitmap 212 at an index that coincides with the offset value. For example, the database engine 120 can perform a lookup of the index ((320) minus (224)=(96)) of the bitmap 212, and identify the value stored therein (illustrated in FIG. 4D as the bitmap value 406). As previously described herein, a value of (1) can indicate that the row ID (320) is associated with the index structure 114.

Figure 4G:
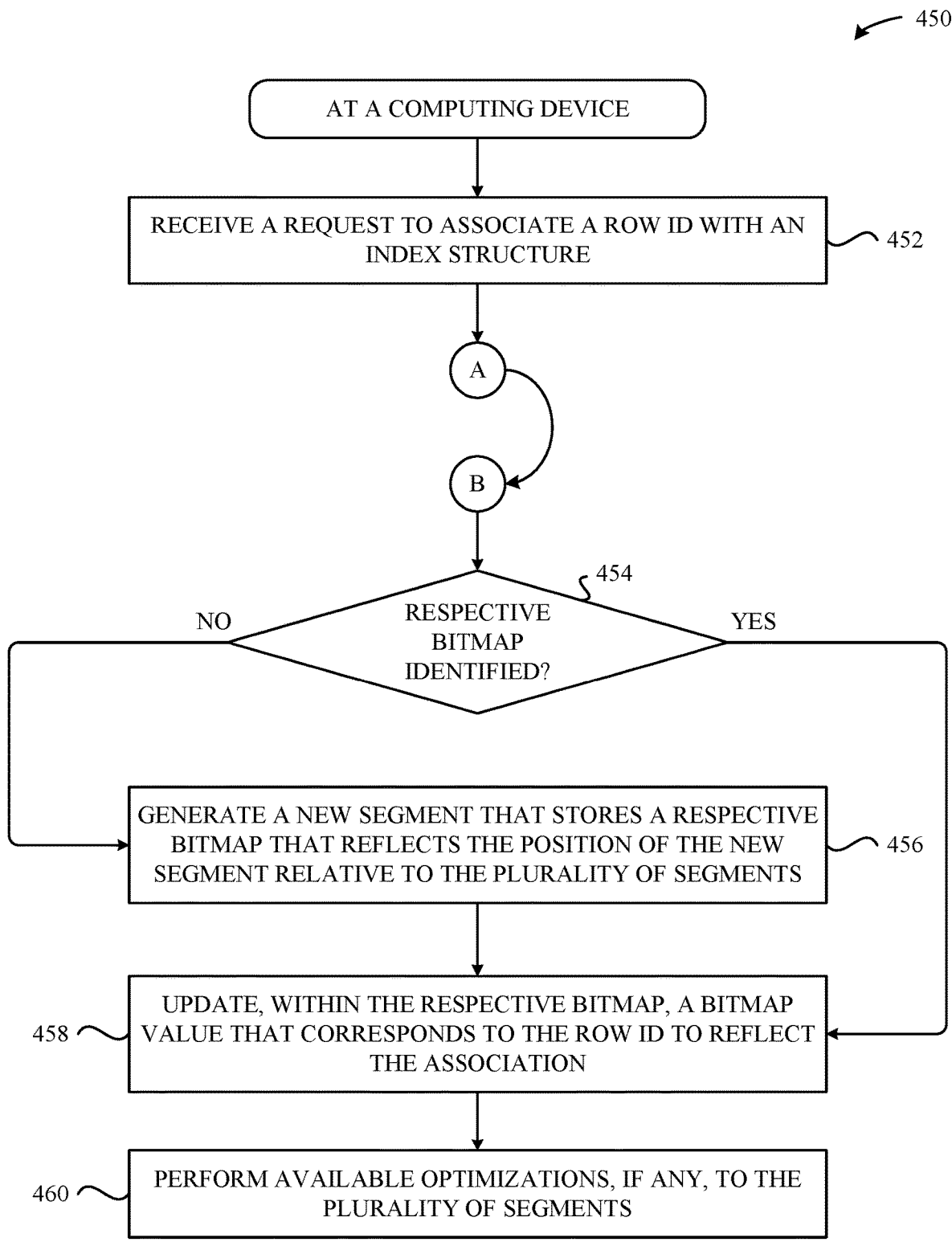

Accordingly, FIGS. 4A-4F illustrate an example breakdown of the manner in which the database engine 120 enables the insertions of new rows 110 to be reflected within an index structure 114. Additional high-level details will now be provided below in conjunction with FIG. 4G, which illustrates a method 450 that can be implemented to carry out the technique described above in conjunction with FIGS. 4A-4F. As shown in FIG. 4G, the method 450 begins at step 452, where the database engine 120 receives a request to associate a row ID with an index structure (e.g., as described above in conjunction with FIG. 4A). As illustrated in FIG. 4G, the method 450 can proceed to steps 354-360 of FIG. 3E, where the database engine 120 carries out similar steps that coincide with the method 450 (e.g., those described above in conjunction with FIGS. 3A-3C). When step 360 of FIG. 3E is completed, the database engine 120 returns to step 454 of FIG. 4G, and determines whether the respective bitmap is identified. If, at step 454, the database engine 120 determines that the respective bitmap is identified, then the method 450 proceeds to step 458. Otherwise, the method 450 proceeds to step 456, where the database engine 120 generates a new segment that stores a respective bitmap that reflects the position of the new segment relative to the plurality of segments. At step 458, the database engine 120 updates, within the respective bitmap, a bitmap value that corresponds to the row ID to reflect the association (e.g., as described above in conjunction with FIGS. 4D-4F). At step 460, the database engine 120 performs available optimizations, if any, to the plurality of segments (e.g., as described above in conjunction with FIGS. 4D-4F).

Accordingly, FIGS. 4A-4G illustrate the manner in which index structures 114 can be implemented to enable insertions of new rows 110 to be reflected in an efficient manner, according to some embodiments. As previously noted herein, the database engine 120 can also be configured to actively manage the segments 118 in accordance with deletions that are made to rows 110 associated with index structures 114. For example, the database engine 120 can be configured to split, merge, and delete segments 118 for a given index structure 114 (where possible) to minimize the amount of storage space consumed by the index structure 114 while enabling the index structure 114 to fully represent, both actively and passively, the row IDs that can potentially be associated with the index structure 114.

Figure 5A:
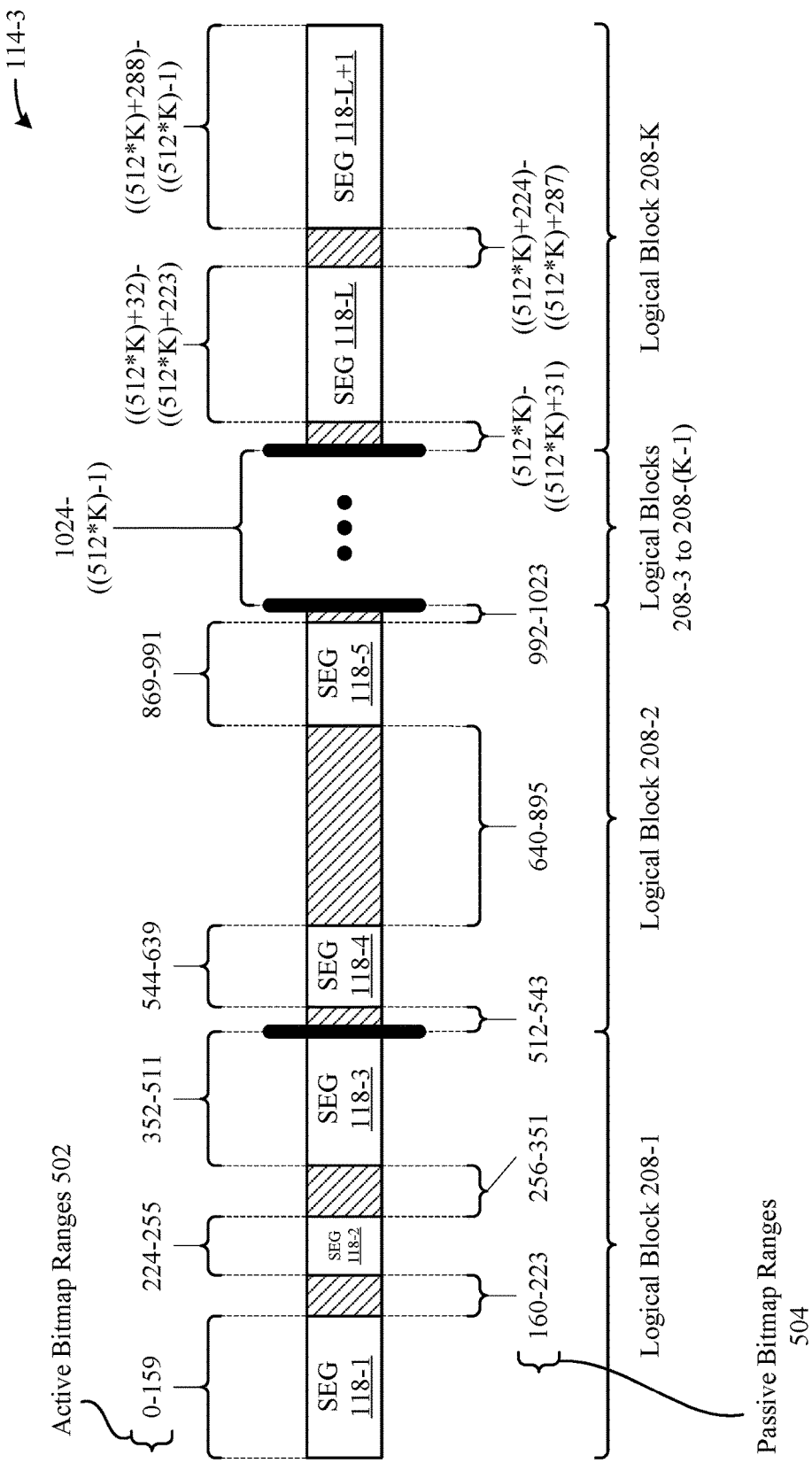
FIGS. 5A-5G illustrate conceptual and method diagrams that demonstrate the manner in which index structures can be implemented to enable deletions of rows to be reflected within the index structures, according to some embodiments.

Accordingly, FIGS. 5A-5F illustrate the manner in which index structures 114 can be implemented to enable deletions of rows 110 to be reflected, according to some embodiments. FIG. 5A illustrates an example initial state of an index structure 114-3, where the index structure 114-3 is comprised of a collection of segments 118, and where different groups of the segments 118 are logically encompassed by different logical blocks 208. As indicated by the active bitmap ranges 502, each of the segments 118 represents a different portion of the row IDs that are actively represented by the index structure 114-3. Moreover, the passive bitmap ranges 504 represent different portions of the row IDs that are passively represented by the index structure 114-3. As shown in FIG. 5A, a first step of an example deletion procedure can involve the database engine 120 receiving a request to disassociate a row ID (235) with the index structure 114-3. Deletion requests can originate in scenarios where it is appropriate to remove one or more entries from the database, e.g., when a user closes his or her online account, when a product is deleted from an online catalog, when a pending electronic transaction is completed/migrated to another database, and so on. In the examples illustrated in FIGS. 5A-5F, the index structure 114-3 can be associated with a master key 116 "SFO", such that the first step involves disassociating deleting a particular row 110 (having a value "SFO" at a column 109 that corresponds to the master key 116, and a row ID (235)) from a table 108 associated with the index structure 114-3.

Figure 5B:
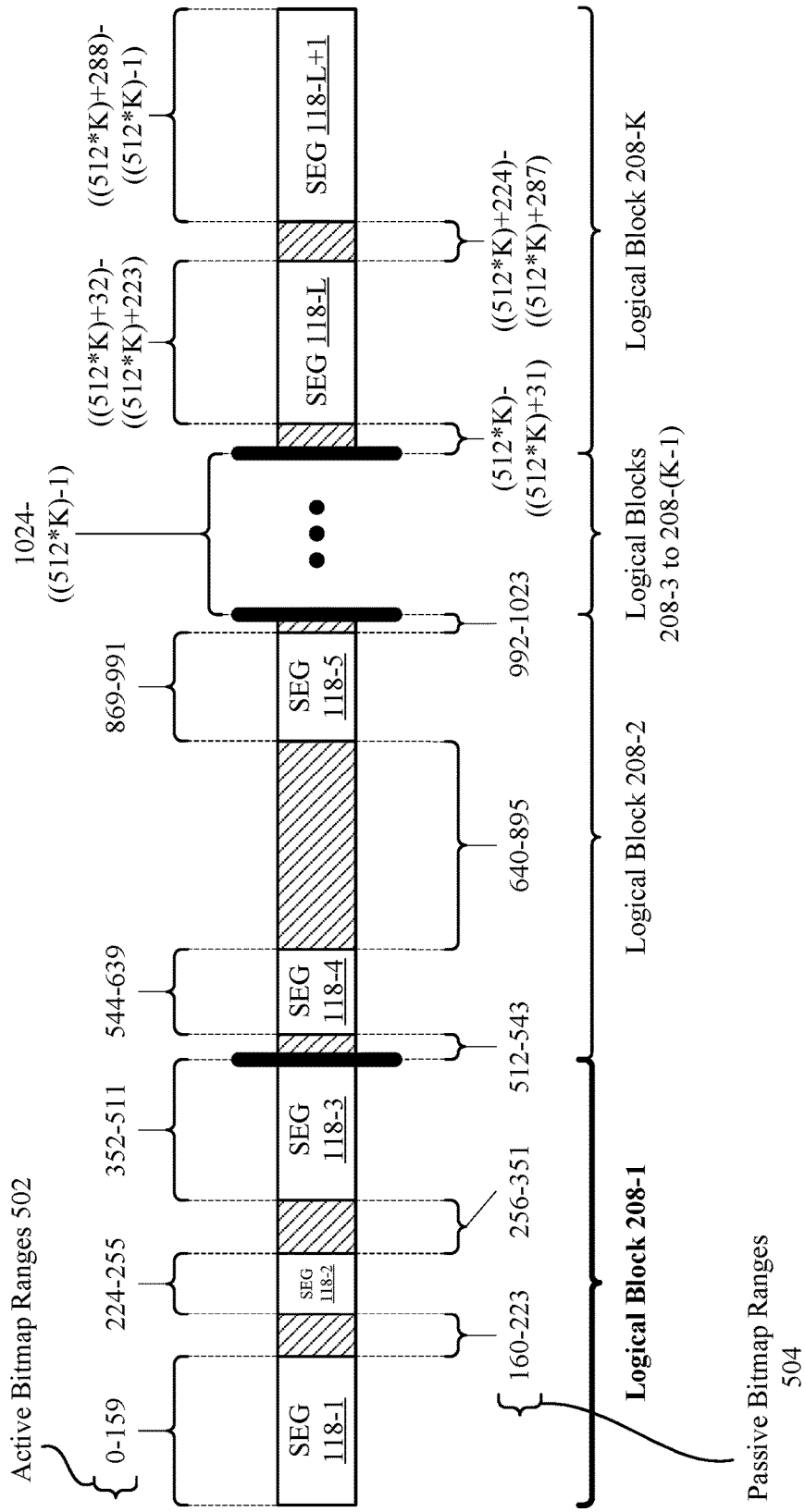

Next, at FIG. 5B, and in response to the request, the database engine 120 can divide the row ID (235) by the size of the logical blocks 208 to identify the logical block 208 that corresponds to the row ID (235). In the examples illustrated in FIGS. 5A-5F, the size of each logical block 208 is 512 bits. In this regard, the database engine 120 identifies that the first logical block 208-1 corresponds to the row ID (235), where the first logical block 208 encompasses three different segments 118 (118-1, 118-2, and 118-3). Again, this identification obviates the need for the database engine 120 to analyze any other segments 118 associated with the index structure 114-3, as the database engine 120 will be able to identify, through analysis of the segments 118-1, 118-2, and 118-3, whether the row ID (235) is actively represented or passively represented. In particular, and as described in greater detail herein, when the row ID (235) is actively represented by one of the segments 118-1, 118-2, and 118-3, the database engine 120 can be configured to identify the appropriate bitmap 212, and update the value (e.g., set to (0)) within the bitmap 212 that corresponds to the row ID (235). Conversely, when the row ID (235) is passively represented within the logical block 208-1, the database engine 120 can be configured to return an error, as the row ID (235) is not associated with the index structure 114-3, and therefore cannot be disassociated therefrom.

Figure 5C:
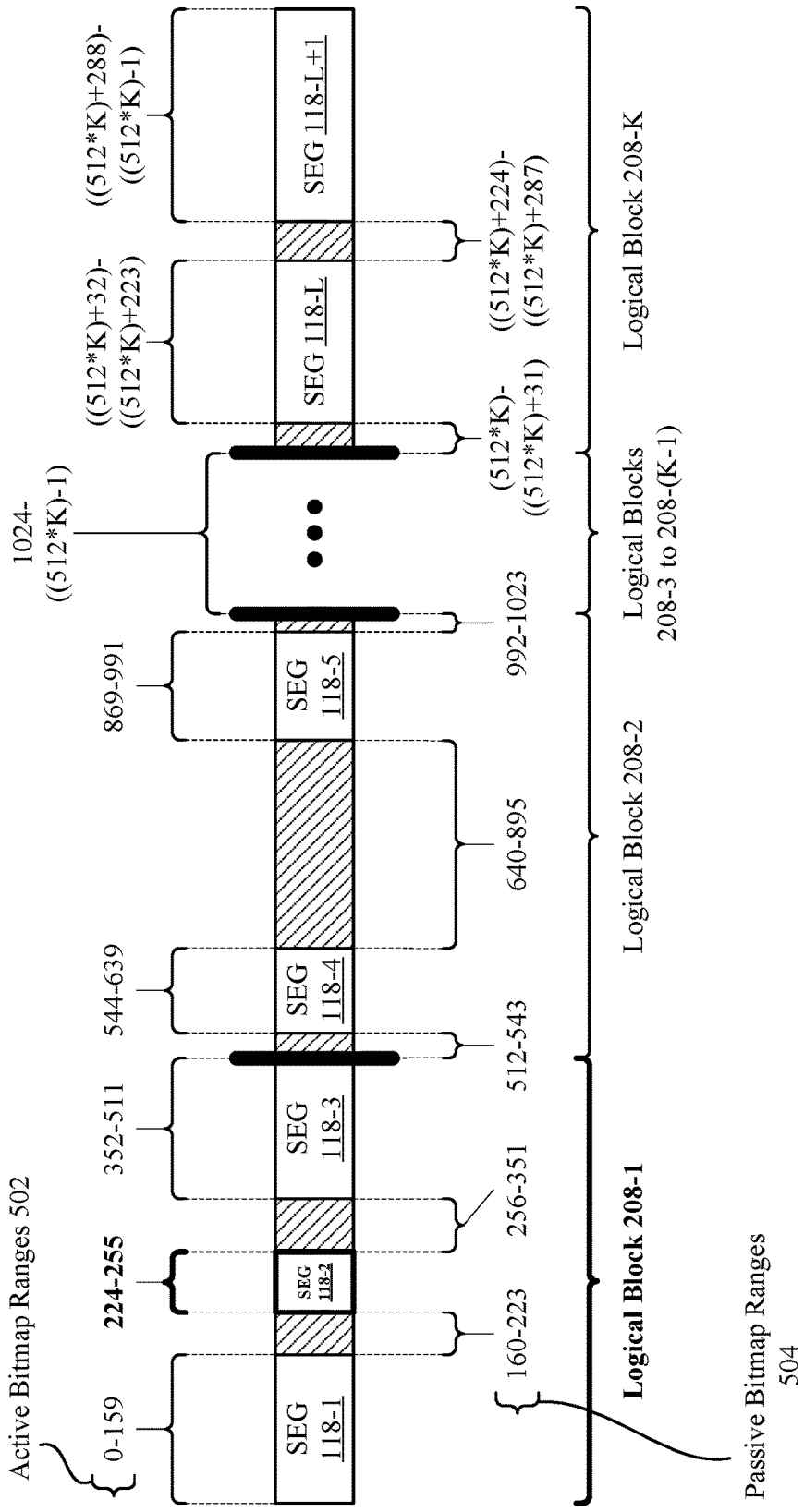
Figure 5D:
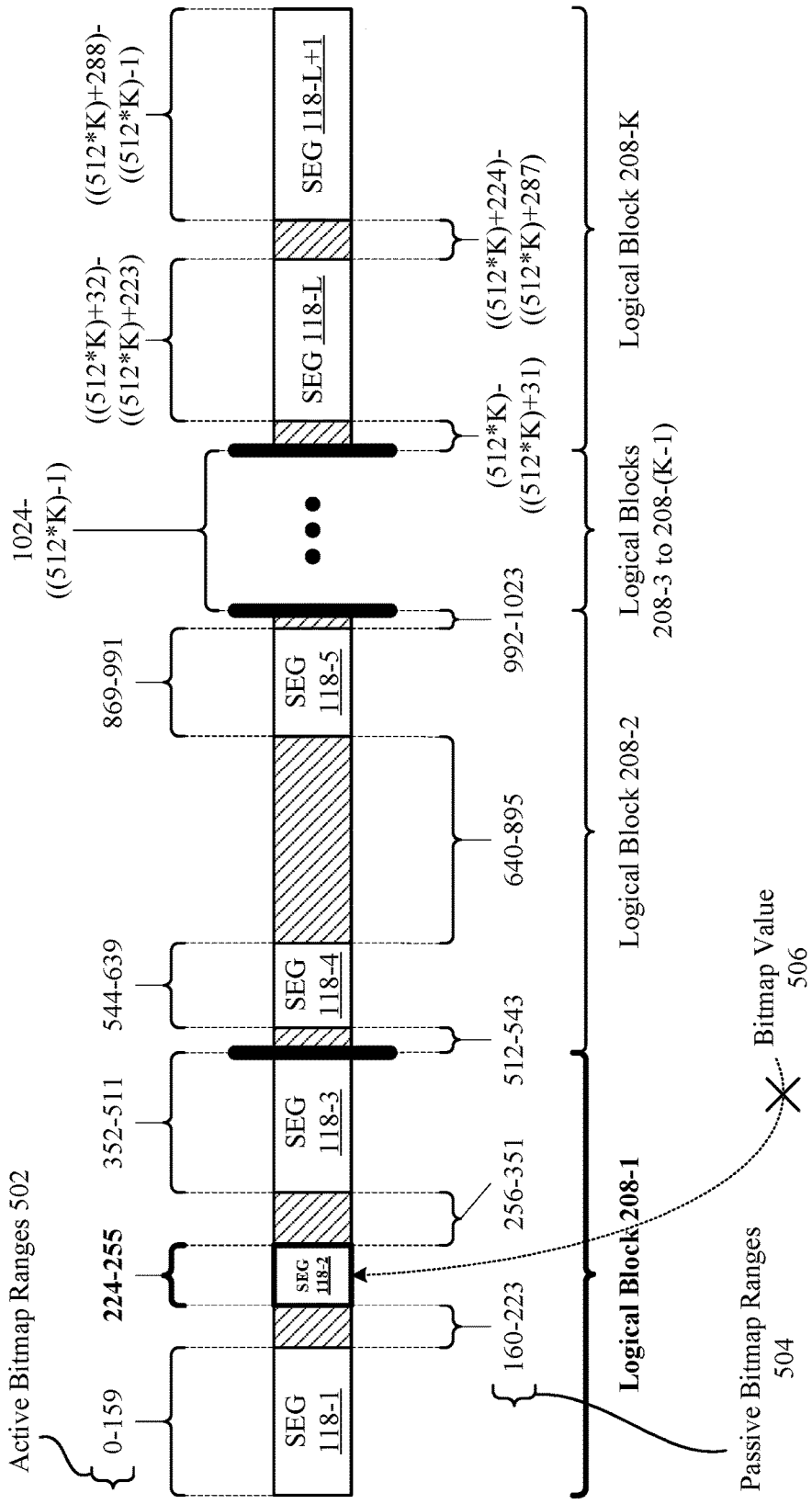

Accordingly, a third step illustrated in FIG. 5C involves the database engine 120 beginning with segment 118-1, and analyzing its (1) start index 210, and (2) bitmap 212, to determine whether the segment 118-1 actively represents the row ID (235). In the example illustrated in FIG. 5C, the segment 118-1 actively represents the row IDs (0-159). In this regard, the start index 210 for the segment 118-1 is 0, and the size of its bitmap 212 is (160) bits. Accordingly, the database engine 120 can identify that the row ID (235) is not actively represented by the segment 118-1, and can move on to the next segment 118, which is the segment 118-2. Accordingly, because the segment 118-2 actively represents the row IDs (224-255), the database engine 120 is able to identify that the row ID (235) is actively represented by the segment 118-2. In turn, at a fourth step in FIG. 5D, the database engine 120 can be configured to identify the value within the bitmap 212 (of the segment 118-2) that corresponds to the row ID (235). For example, the database engine 120 can subtract the start index 210 of the segment 118-2 (i.e., (224)) to identify an offset value, and reference the value stored in the bitmap 212 at an index that coincides with the offset value. For example, the database engine 120 can perform a lookup of the index ((235) minus (224)=(11)) of the bitmap 212, and identify the value stored therein (illustrated in FIG. 5D as the bitmap value 506). As previously described herein, a value of (0) can indicate that the row ID (235) is disassociated from the index structure 114.

Figure 5E:
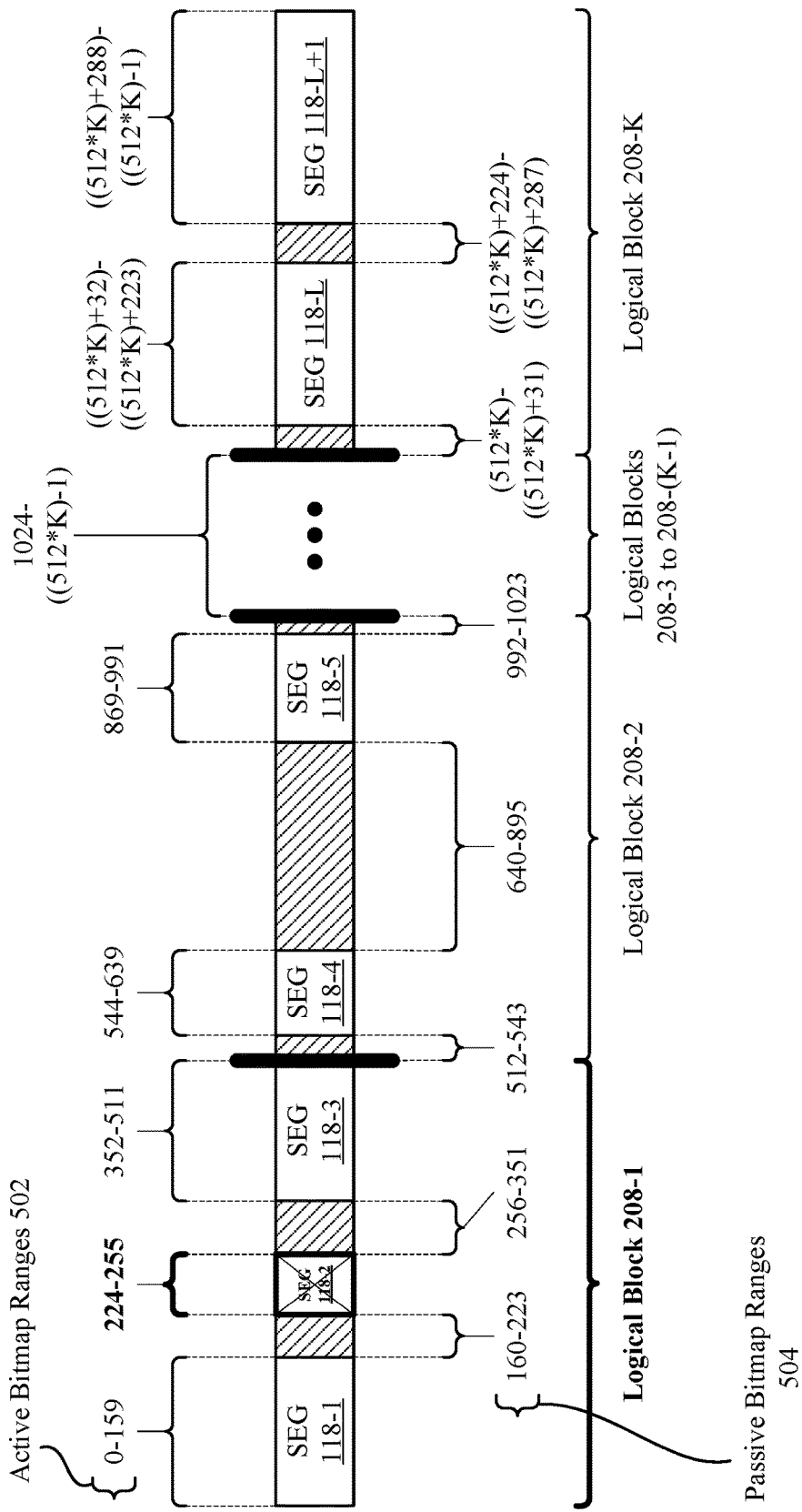
Figure 5F:
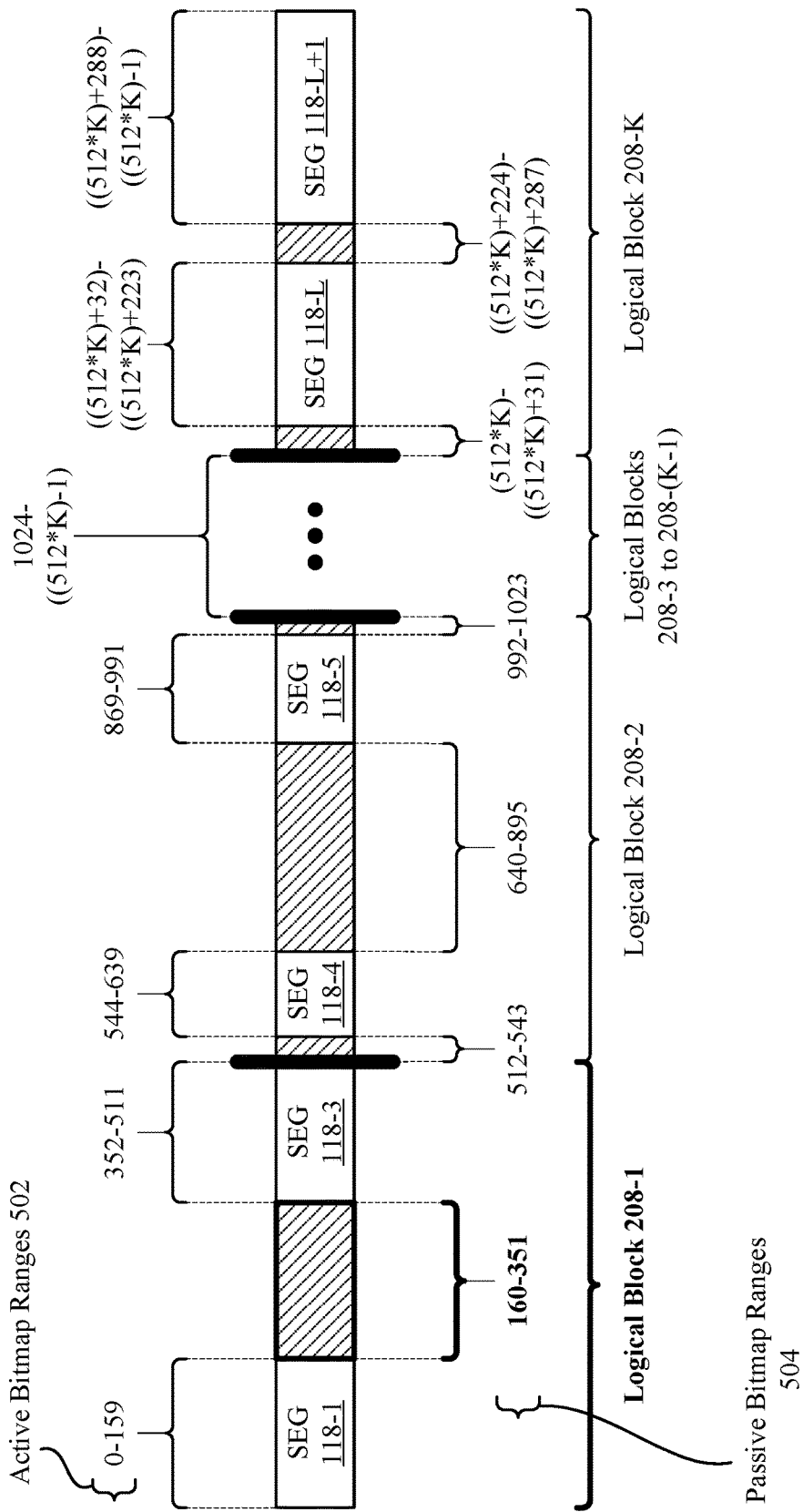

In turn, at a fifth step in FIG. 5E, the database engine 120 can identify an available optimization where the bitmap 212 of the segment 118-2 is empty (e.g., all zeroes) and can therefore be deleted. In such a case, the row IDs represented by the bitmap 212 of the segment 118-2 can be passively represented in the same manner as they are actively represented, which establishes a scenario in which the segment 118-2 can be deleted to increase storage space. Accordingly, the database engine 120 can be configured to delete the segment 118-2 at a sixth step in FIG. 5F, thereby rendering an index structure 114 in which the row IDs (160-351) are passively represented. Additionally, and according to some embodiments, a given segment 118 can be logically split to create a "hole" when the bitmap 212 of the segment 118 is empty and can be deleted. This technique contrasts merging segments 118 in cases where a new row ID is associated with an index structure 114. In particular, when a row ID is disassociated from an index structure 114, and a contiguous sequence of bits (which is the minimum segment 118 size (e.g., thirty-two bits)) is empty (e.g., all zeroes), the original segment 118 can be split to reflect this change. Consequently, such a split can involve deleting a prefix of the original segment 118, deleting a suffix of the original segment 118, or splitting the original segment 118 into two smaller segments 118.

Figure 5G:
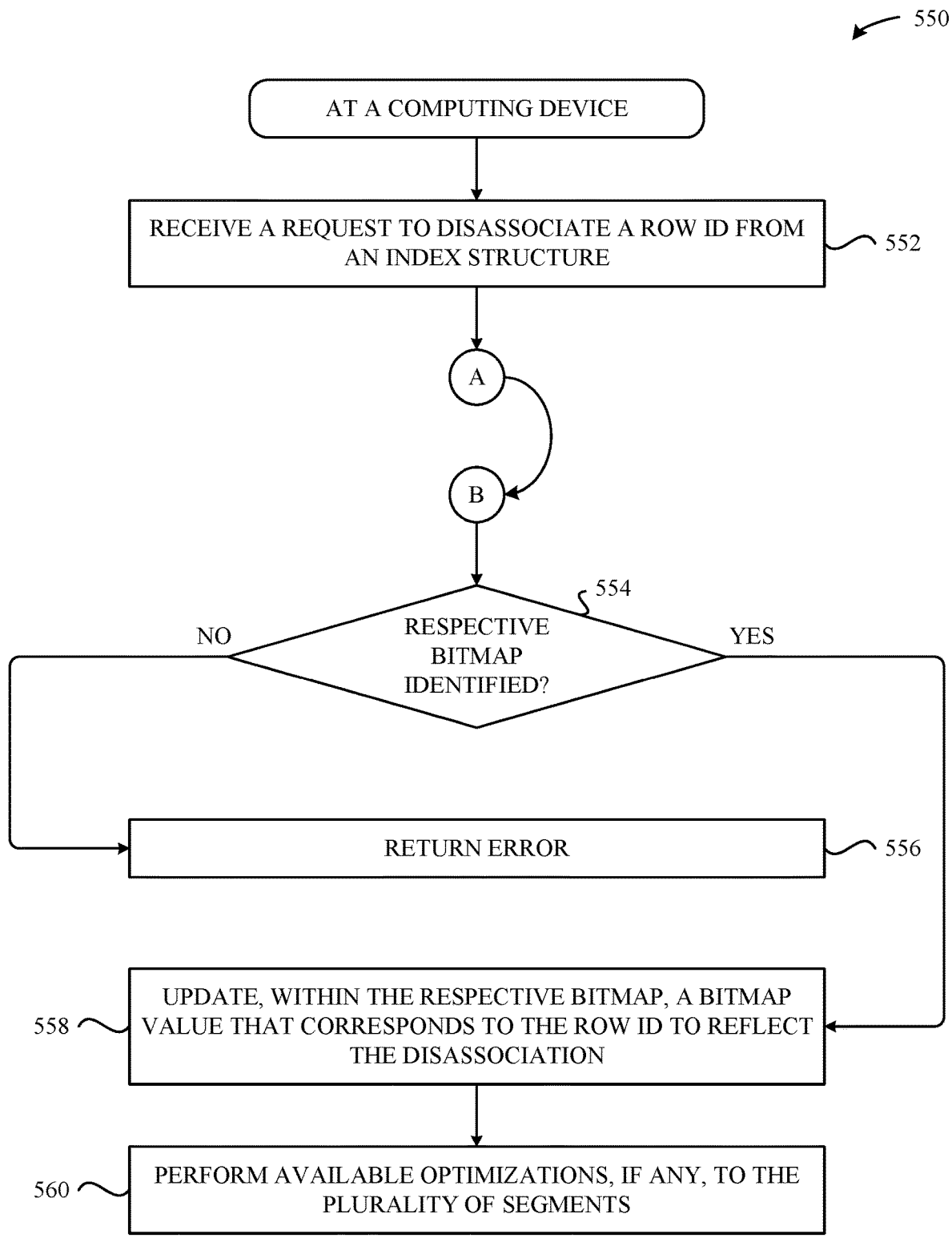

Accordingly, FIGS. 5A-5F illustrate an example breakdown of the manner in which index structures 114 can be implemented to enable deletions of rows 110 to be reflected in an efficient manner. Additional high-level details will now be provided below in conjunction with FIG. 5G, which illustrates a method 550 that can be implemented to carry out the technique described above in conjunction with FIGS. 5A-5F. As shown in FIG. 5G, the method 550 begins at step 552, where the database engine 120 receives a request to disassociate a row ID from an index structure. As illustrated in FIG. 5G, the method can proceed to steps 354-360 of FIG. 3E, where the database engine 120 carries out similar steps that coincide with the method 350. When step 360 of FIG. 3E is completed, the database engine returns to step 554 of FIG. 5G and determines whether the respective bitmap is identified. If, at step 554, the database engine 120 determines that the respective bitmap is identified, then the method 550 proceeds to step 558. Otherwise, the database engine 120 returns an error at step 556 (e.g., as described above in conjunction with FIGS. 5A-5C). At step 558, the database engine 120 updates, within the respective bitmap, a bitmap value that corresponds to the row id to reflect the disassociation (e.g., as described above in conjunction with FIG. 5D). At step 560, the database engine 120 performs available optimizations, if any, to the plurality of segments (e.g., as described above in conjunction with FIGS. 5E-5F).

Figure 6:
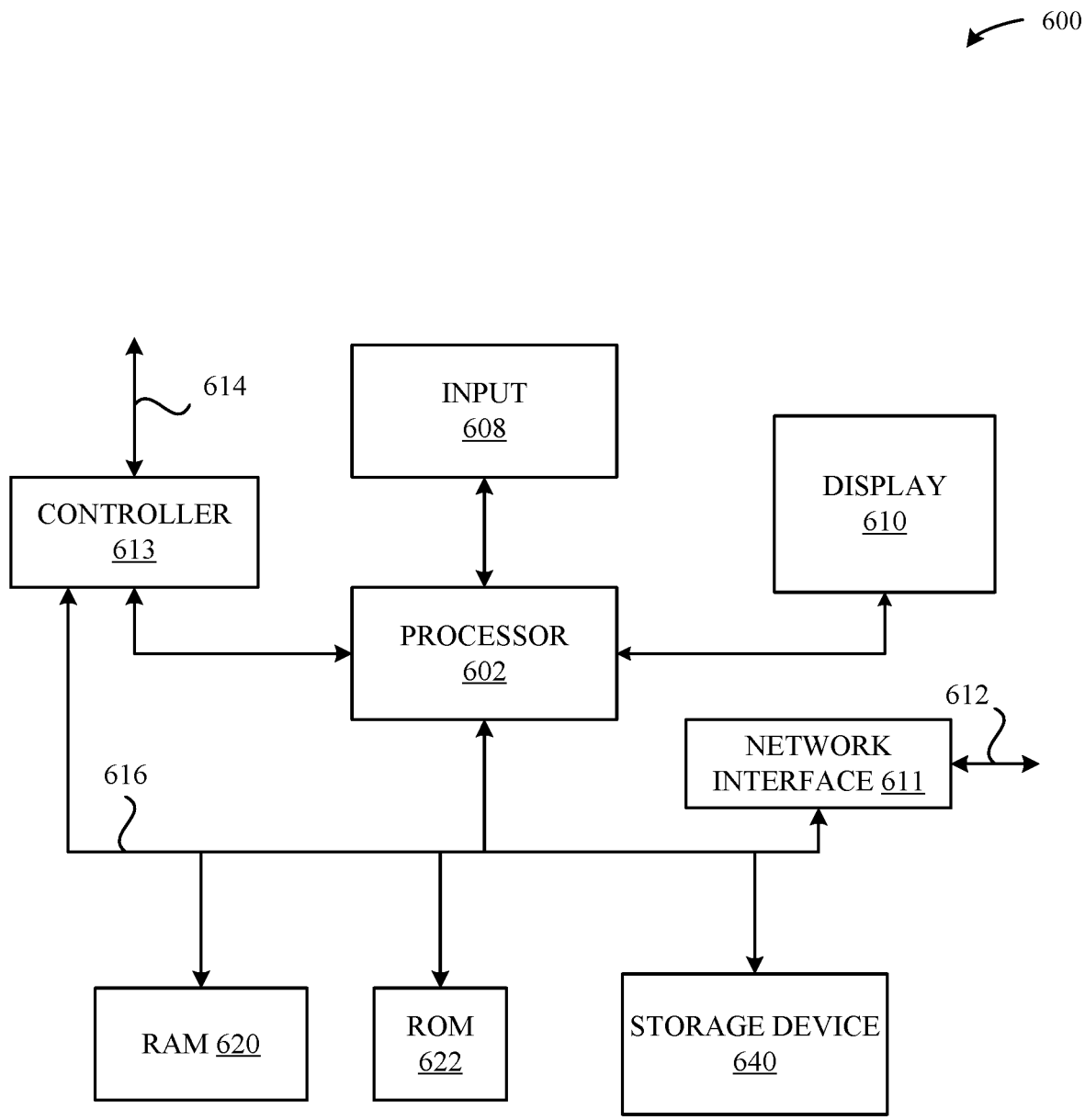
FIG. 6 illustrates a detailed view of a computing device that can be used to implement the various components described herein, according to some embodiments.

FIG. 6 illustrates a detailed view of a computing device 600 that can be used to implement the various components described herein, according to some embodiments. In particular, the detailed view illustrates various components that can be included in the server computing devices 102 illustrated in FIG. 1. As shown in FIG. 6, the computing device 600 can include a processor 602 that represents a microprocessor or controller for controlling the overall operation of computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, etc. Still further, the computing device 600 can include a display 610 (screen display) that can be controlled by the processor 602 to display information to the user. A data bus 616 can facilitate data transfer between at least a storage device 640, the processor 602, and a controller 613. The controller 613 can be used to interface with and control different equipment through and equipment control bus 614. The computing device 600 can also include a network/bus interface 611 that couples to a data link 612. In the case of a wireless connection, the network/bus interface 611 can include a wireless transceiver.

The computing device 600 also includes a storage device 640, which can comprise a single disk or a plurality of disks (e.g., SSDs), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data that can be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for identifying whether an association exists between a row identifier (ID) and an index structure for a database table, the method comprising:
    identifying, based on the row ID, a logical block that encompasses a plurality of segments, wherein each segment of the plurality of segments stores a respective bitmap;
    parsing each segment of the plurality of segments to identify a respective bitmap that encompasses the row ID; and
    returning, from the respective bitmap, a bitmap value that corresponds to the row ID.

2. The method of claim 1, further comprising:
    in response to determining that (1) the plurality of segments is empty, or (2) the plurality of segments is empty:
        indicating that the association does not exist between the row ID and the index structure.

3. The method of claim 1, further comprising:
    in response to failing to identify, among the plurality of segments, a respective bitmap that encompasses the row ID:
        indicating that the association does not exist between the row ID and the index structure.

4. The method of claim 1, wherein identifying, among the plurality of segments, whether a respective bitmap encompasses the row ID comprises:
    identifying a respective start index of the bitmap,
    identifying a length of the respective bitmap, and
    determining whether the row ID is included in a range of values that begins at the respective start index and ends at a summation of the respective start index and the length of the respective bitmap.

5. The method of claim 1, wherein the logical block is included in a plurality of logical blocks, and the plurality of logical blocks collectively encompasses a range that accommodates a lowest row ID of a first row associated with the index structure and a highest row ID of a highest row associated with the index structure.

6. The method of claim 5, wherein:
    each logical block of the plurality of logical blocks logically encompasses zero or more segments of the plurality of segments, and
    the respective bitmap associated with each segment of the plurality of segments satisfies:
        a minimum size that is a power of two, and
        a maximum size that is a power of two.

7. The method of claim 5, wherein the logical block is associated with a logical block ID, and the logical block ID is an integer representation of the row ID divided by a size associated with each logical block of the plurality of logical blocks.

8. At least one non-transitory computer readable storage medium configured to store instructions that, when executed by at least one processor included in a computing device, cause the computing device to identify whether an association exists between a row identifier (ID) and an index structure for a database table, by carrying out steps that include:
    identifying, based on the row ID, a logical block that encompasses a plurality of segments, wherein each segment of the plurality of segments stores a respective bitmap;
    parsing each segment of the plurality of segments to identify a respective bitmap that encompasses the row ID; and
    returning, from the respective bitmap, a bitmap value that corresponds to the row ID.

9. The at least one non-transitory computer readable storage medium of claim 8, wherein the steps further include:
    in response to determining that (1) the plurality of segments is empty, or (2) the plurality of segments is empty:
        indicating that the association does not exist between the row ID and the index structure.

10. The at least one non-transitory computer readable storage medium of claim 8, wherein the steps further include:
    in response to failing to identify, among the plurality of segments, a respective bitmap that encompasses the row ID:
        indicating that the association does not exist between the row ID and the index structure.

11. The at least one non-transitory computer readable storage medium of claim 8, wherein identifying, among the plurality of segments, whether a respective bitmap encompasses the row ID comprises:
    identifying a respective start index of the bitmap,
    identifying a length of the respective bitmap, and
    determining whether the row ID is included in a range of values that begins at the respective start index and ends at a summation of the respective start index and the length of the respective bitmap.

12. The at least one non-transitory computer readable storage medium of claim 8, wherein the logical block is included in a plurality of logical blocks, and the plurality of logical blocks collectively encompasses a range that accommodates a lowest row ID of a first row associated with the index structure and a highest row ID of a highest row associated with the index structure.

13. The at least one non-transitory computer readable storage medium of claim 12, wherein:
    each logical block of the plurality of logical blocks logically encompasses zero or more segments of the plurality of segments, and
    the respective bitmap associated with each segment of the plurality of segments satisfies:
        a minimum size that is a power of two, and
        a maximum size that is a power of two.

14. The at least one non-transitory computer readable storage medium of claim 12, wherein the logical block is associated with a logical block ID, and the logical block ID is an integer representation of the row ID divided by a size associated with each logical block of the plurality of logical blocks.

15. A computing device configured to identify whether an association exists between a row identifier (ID) and an index structure for a database table, the computing device comprising:
- at least one processor; and
- at least one memory storing instructions that, when executed by the at least one processor, cause the computing device to:
  - identify, based on the row ID, a logical block that encompasses a plurality of segments, wherein each segment of the plurality of segments stores a respective bitmap;
  - parse each segment of the plurality of segments to identify a respective bitmap that encompasses the row ID; and
  - return, from the respective bitmap, a bitmap value that corresponds to the row ID.

16. The computing device of claim 15, wherein the at least one processor further causes the computing device to:
- in response to determining that (1) the plurality of segments is empty, or (2) the plurality of segments is empty:
  - indicate that the association does not exist between the row ID and the index structure.

17. The computing device of claim 15, wherein the at least one processor further causes the computing device to:
- in response to failing to identify, among the plurality of segments, a respective bitmap that encompasses the row ID:
  - indicate that the association does not exist between the row ID and the index structure.

18. The computing device of claim 15, wherein identifying, among the plurality of segments, whether a respective bitmap encompasses the row ID comprises:
- identifying a respective start index of the bitmap,
- identifying a length of the respective bitmap, and
- determining whether the row ID is included in a range of values that begins at the respective start index and ends at a summation of the respective start index and the length of the respective bitmap.

19. The computing device of claim 15, wherein the logical block is included in a plurality of logical blocks, and the plurality of logical blocks collectively encompasses a range that accommodates a lowest row ID of a first row associated with the index structure and a highest row ID of a highest row associated with the index structure.

20. The computing device of claim 19, wherein:
- each logical block of the plurality of logical blocks logically encompasses zero or more segments of the plurality of segments, and
- the respective bitmap associated with each segment of the plurality of segments satisfies:
  - a minimum size that is a power of two, and
  - a maximum size that is a power of two.

* * * * *